Jan. 13, 1931.   A. JONES ET AL   1,788,397
MACHINE FOR PRINTING FLOOR COVERINGS
Filed Oct. 14, 1926   12 Sheets-Sheet 3
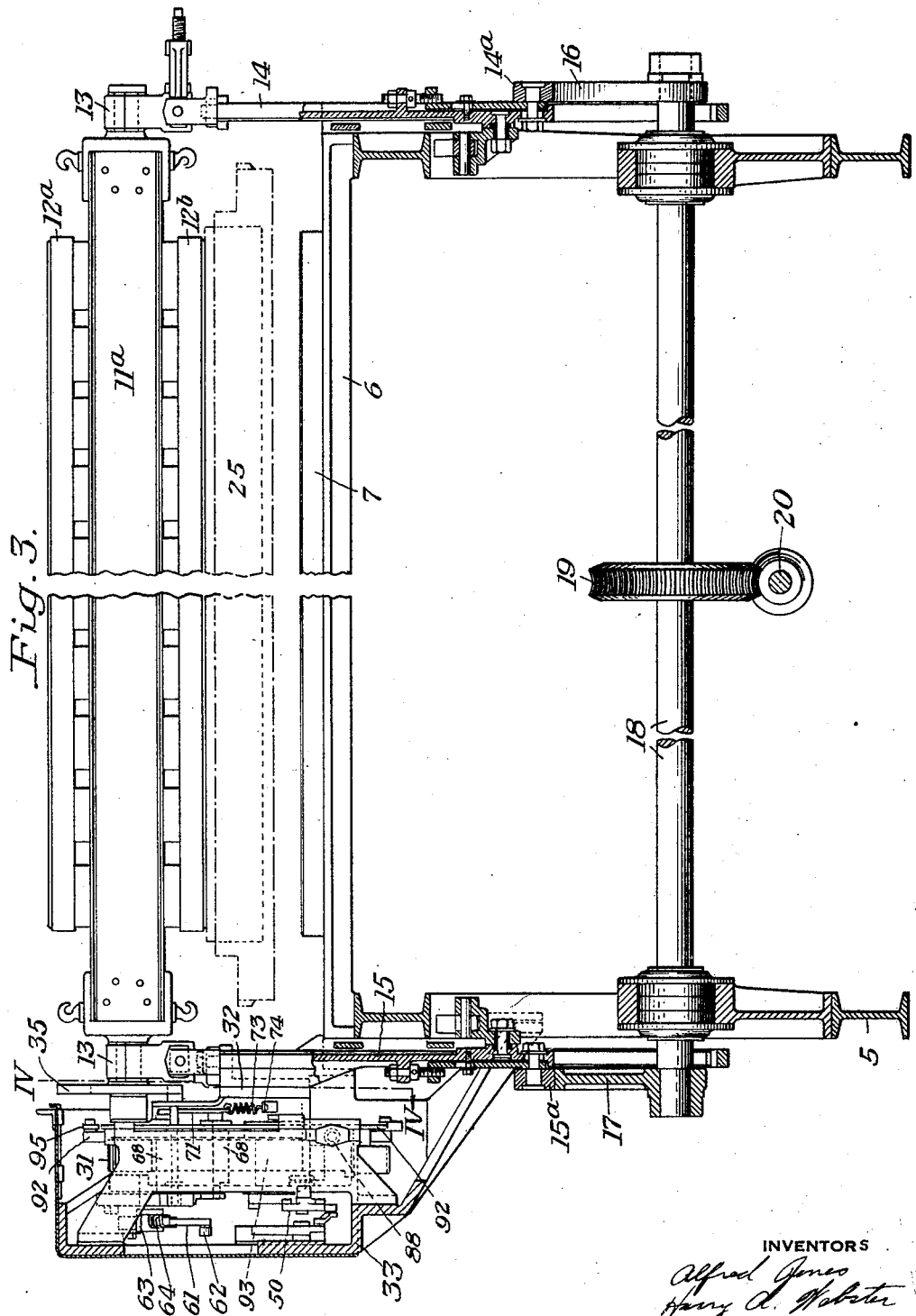
INVENTORS

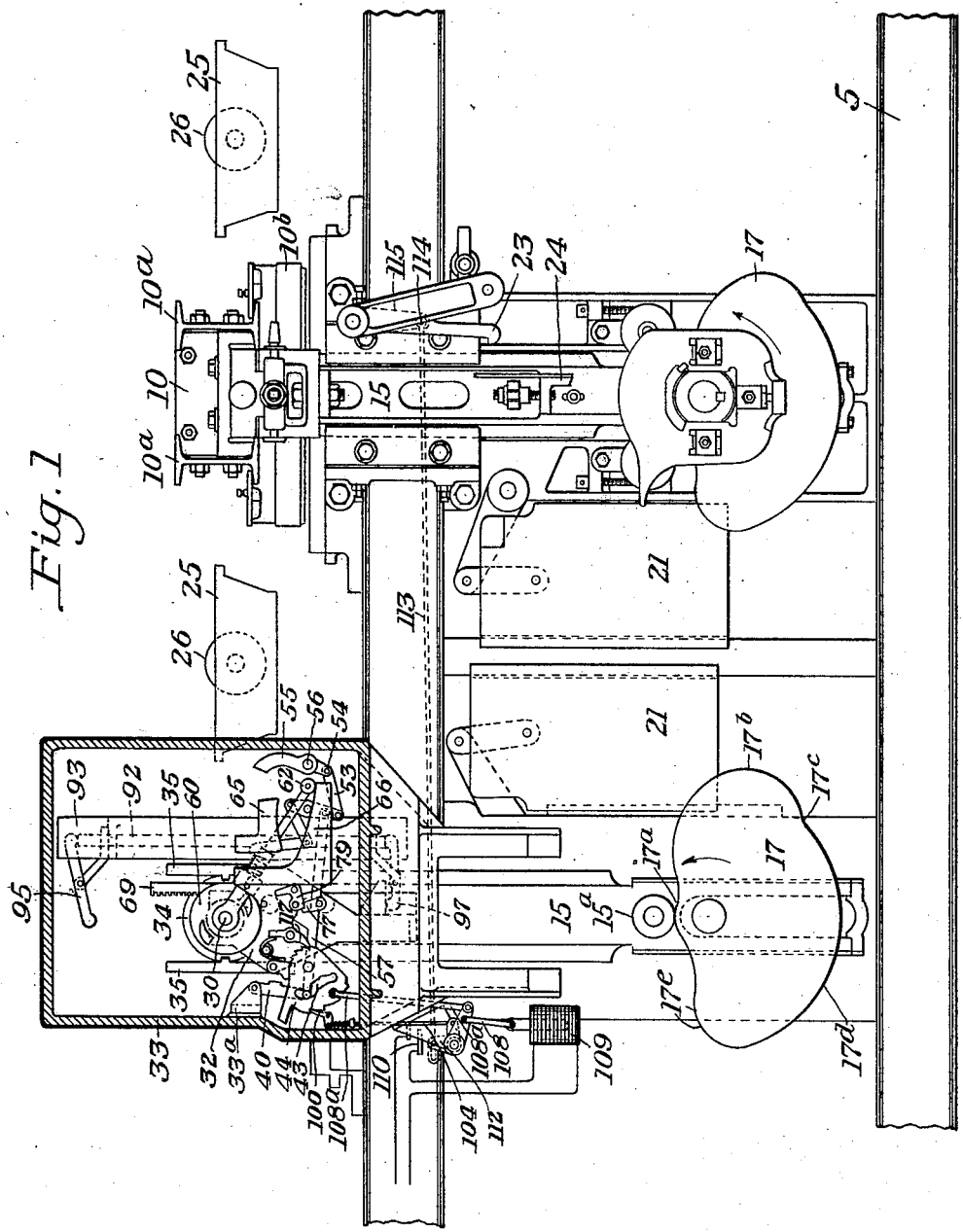

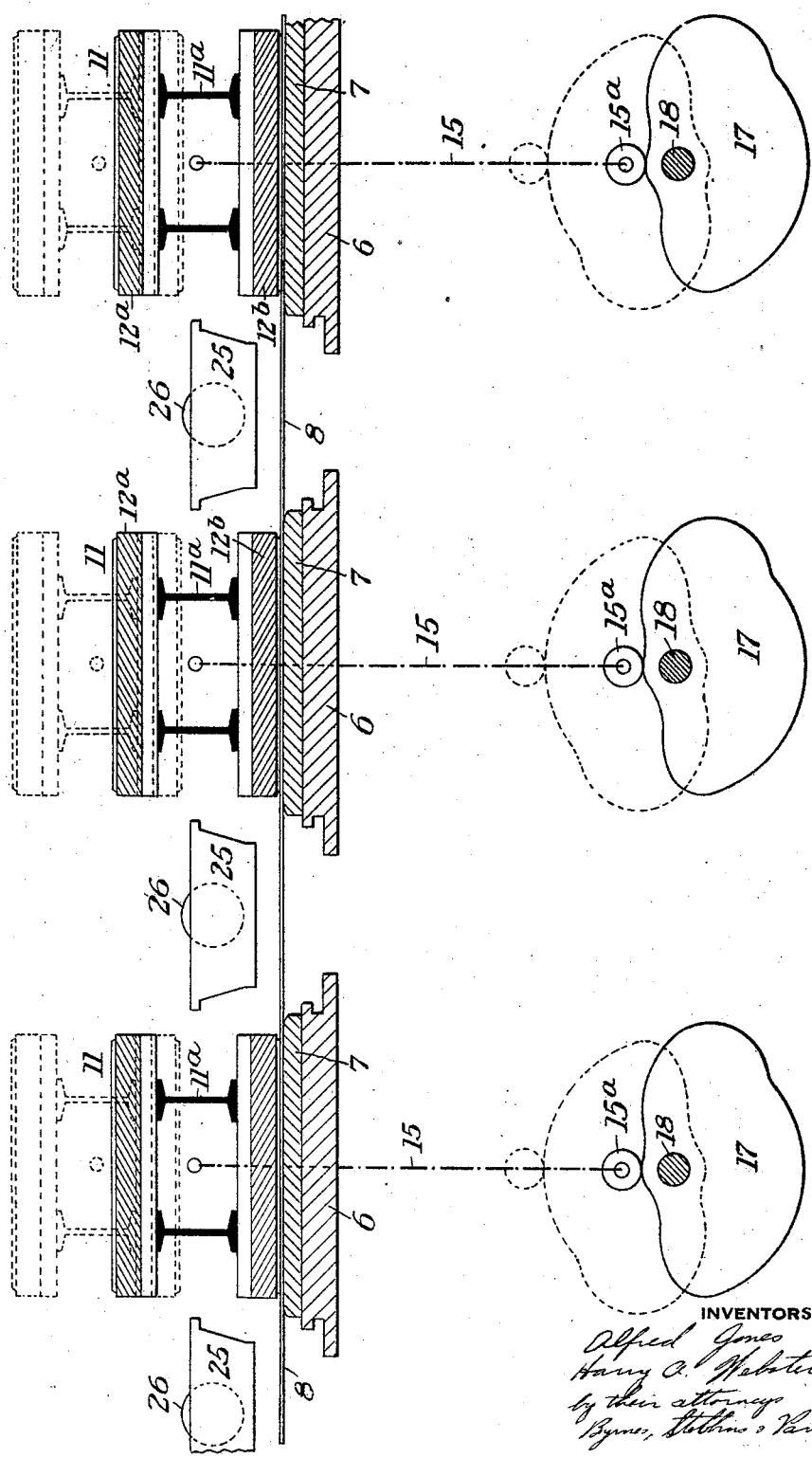

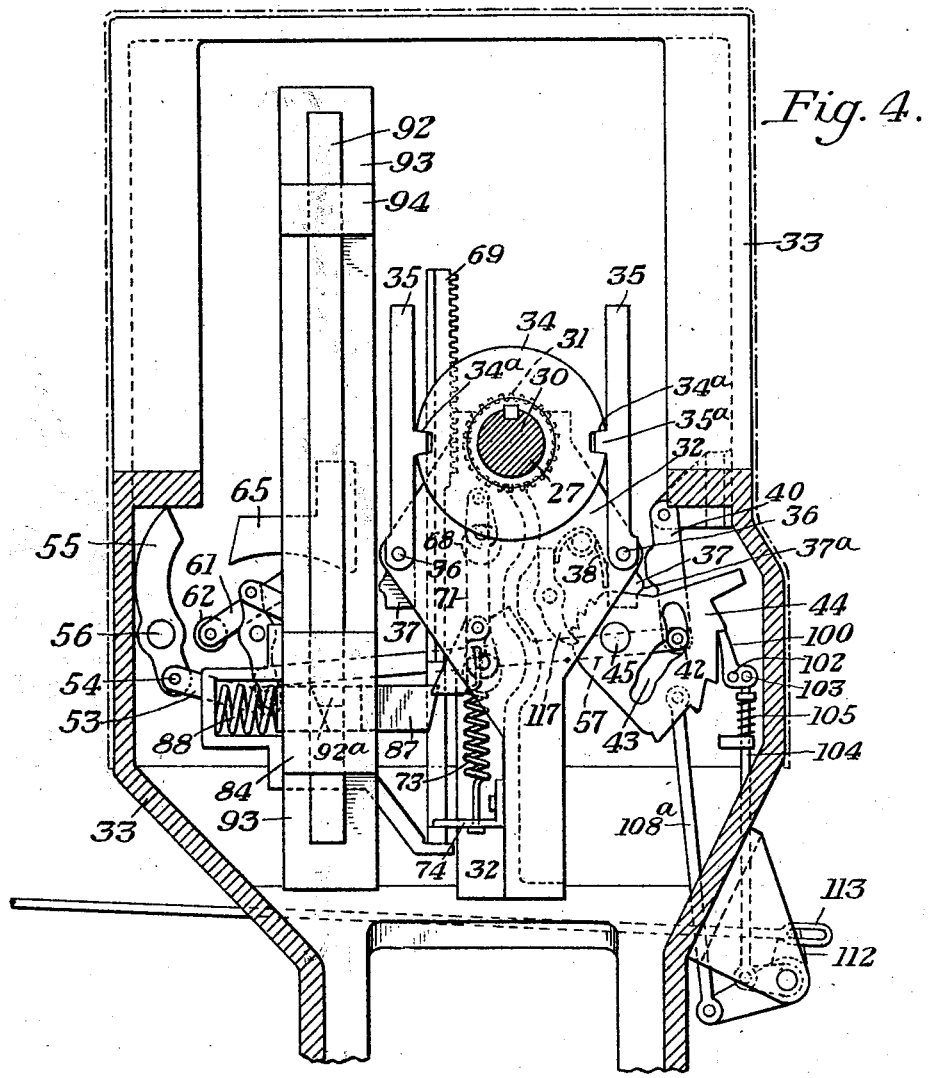

Jan. 13, 1931. A. JONES ET AL 1,788,397
MACHINE FOR PRINTING FLOOR COVERINGS
Filed Oct. 14, 1926 12 Sheets-Sheet 5
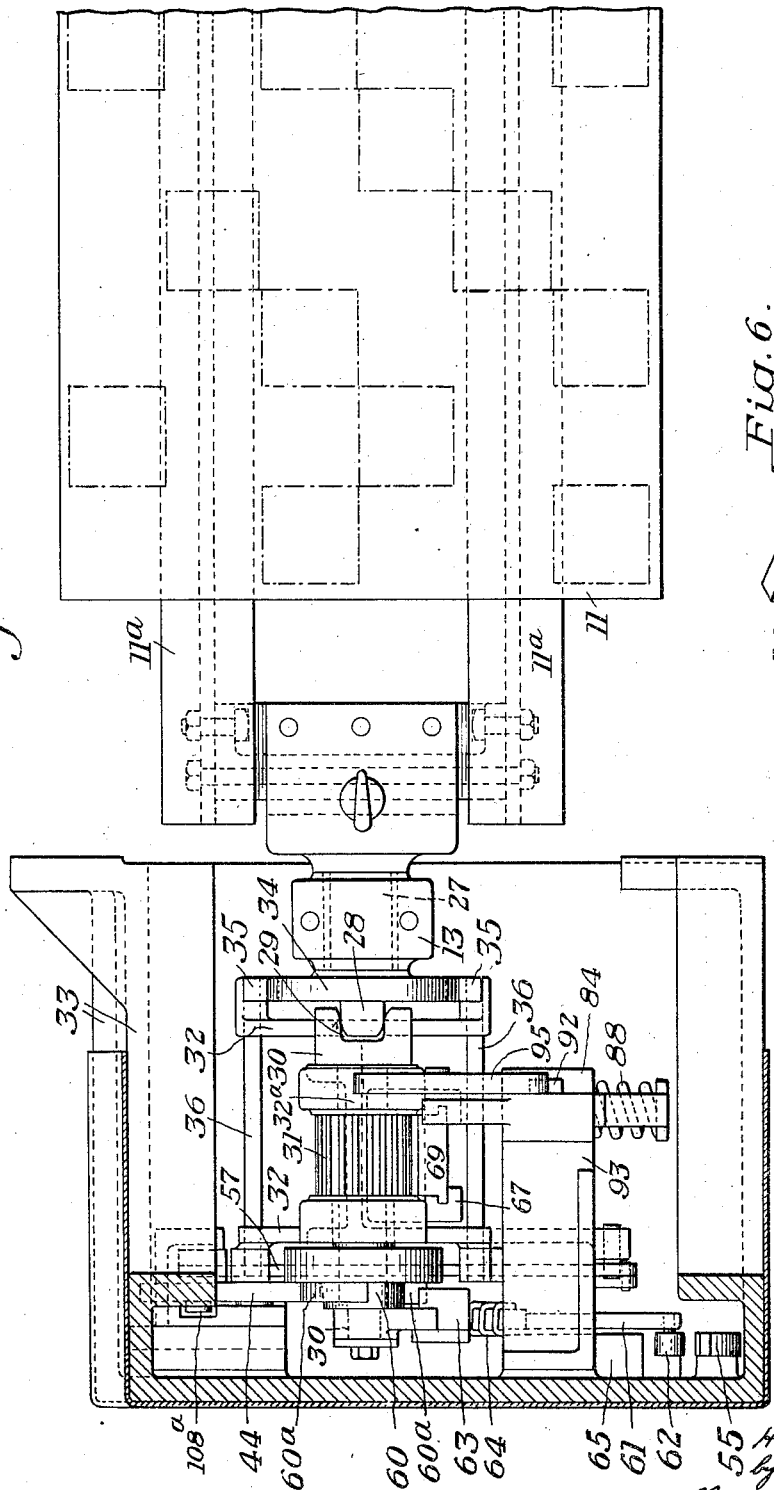
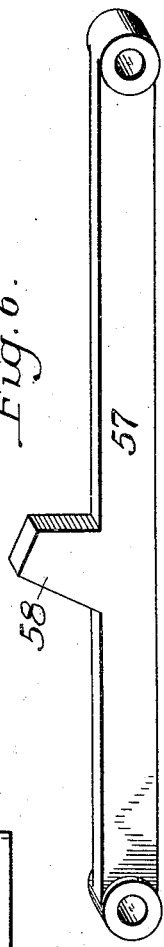

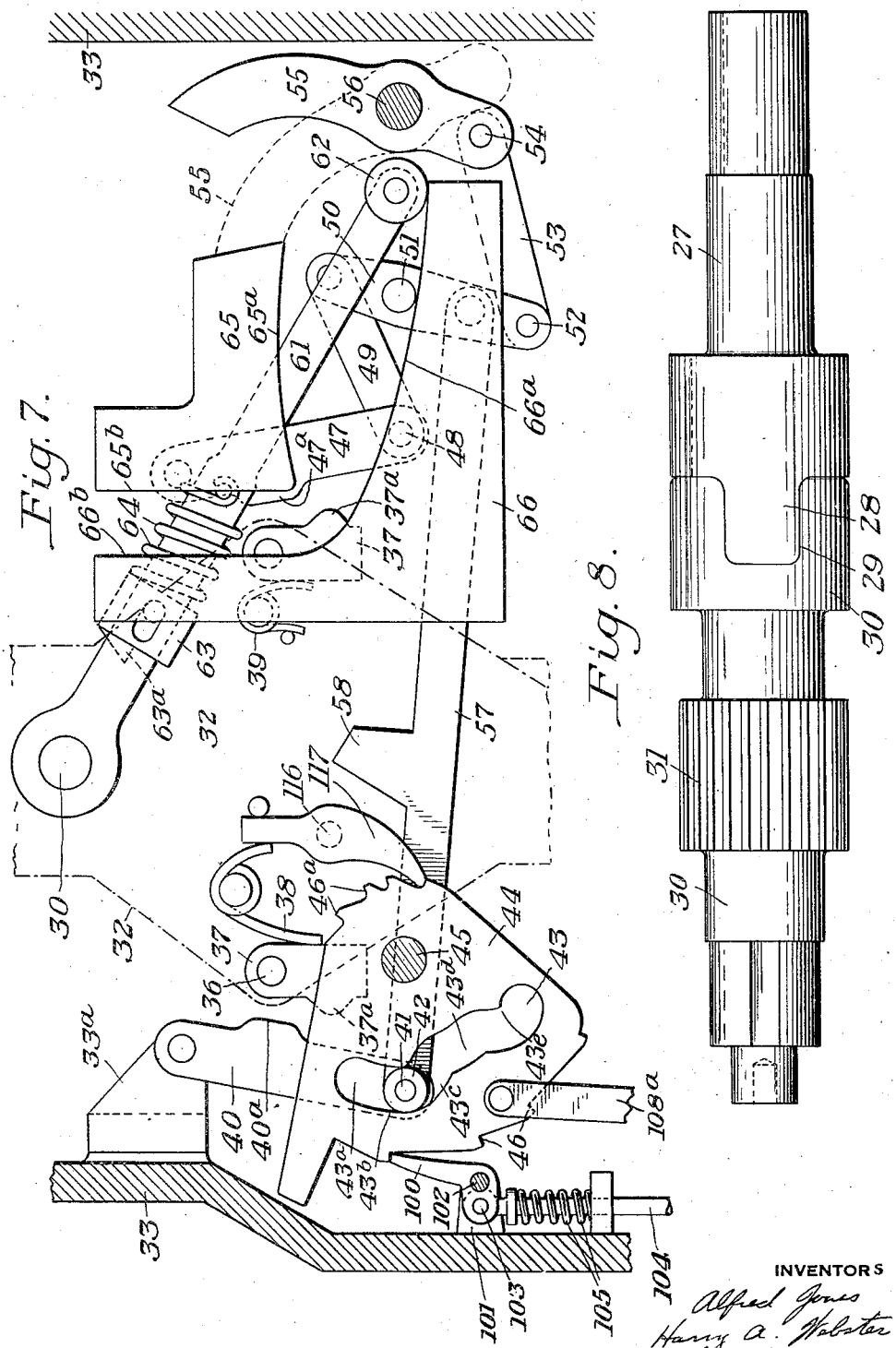

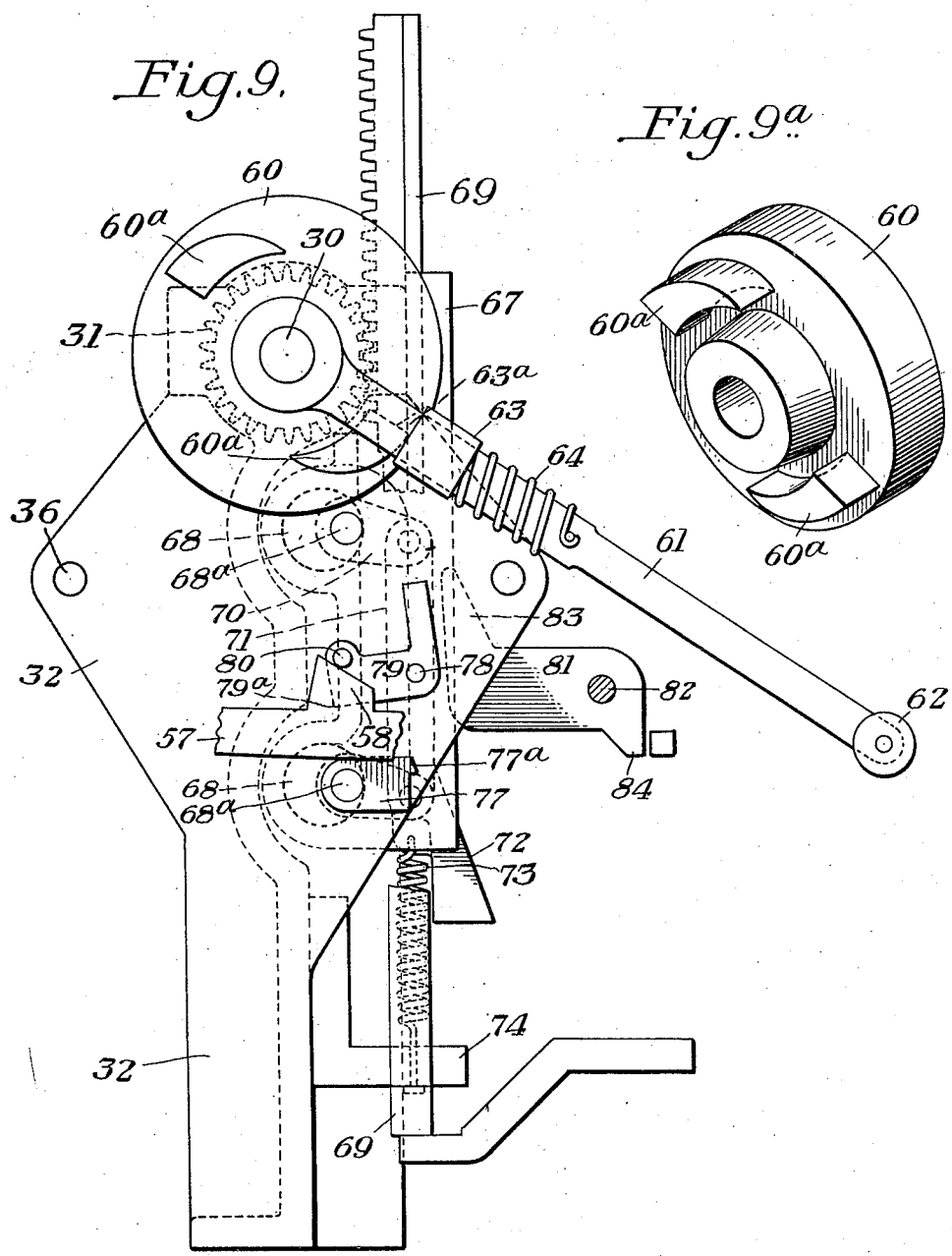

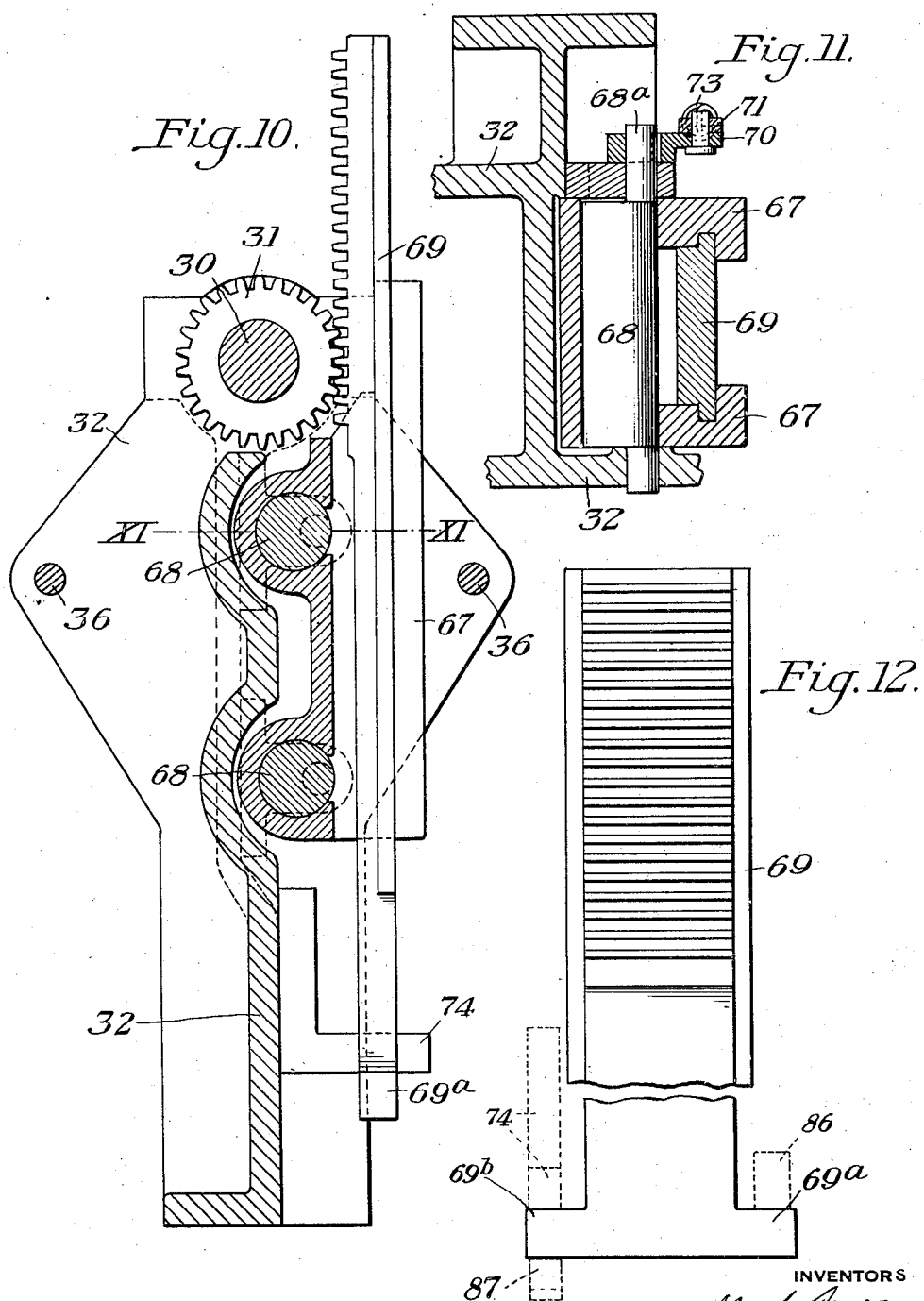

Jan. 13, 1931.    A. JONES ET AL    1,788,397
MACHINE FOR PRINTING FLOOR COVERINGS
Filed Oct. 14, 1926    12 Sheets-Sheet 9
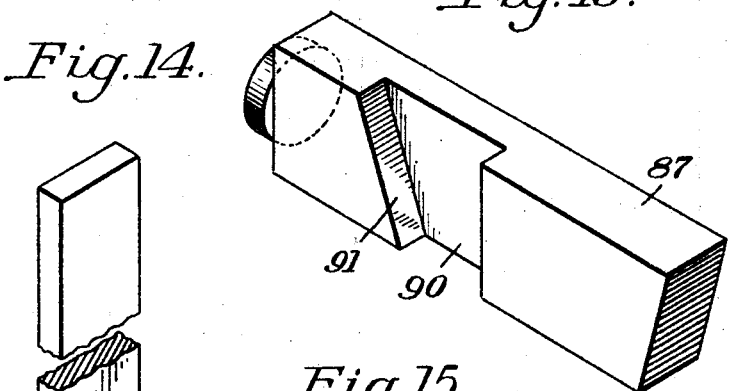
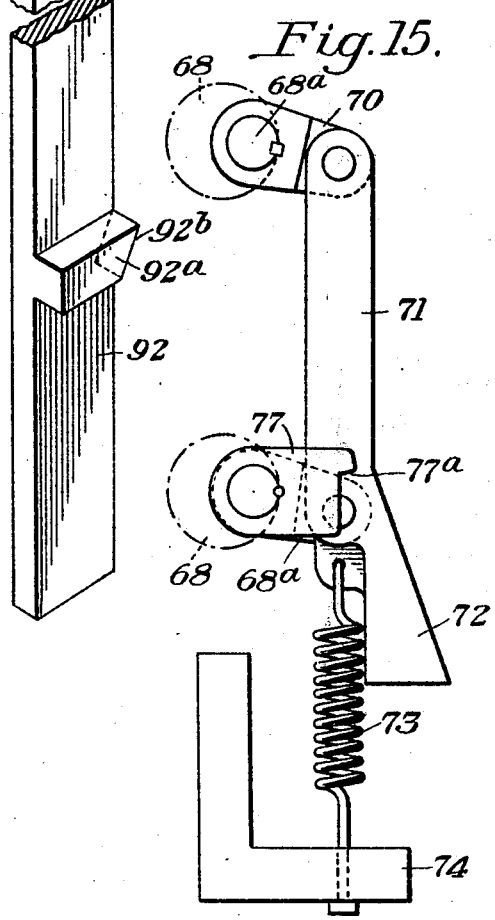
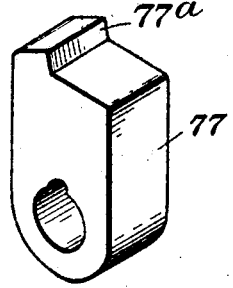

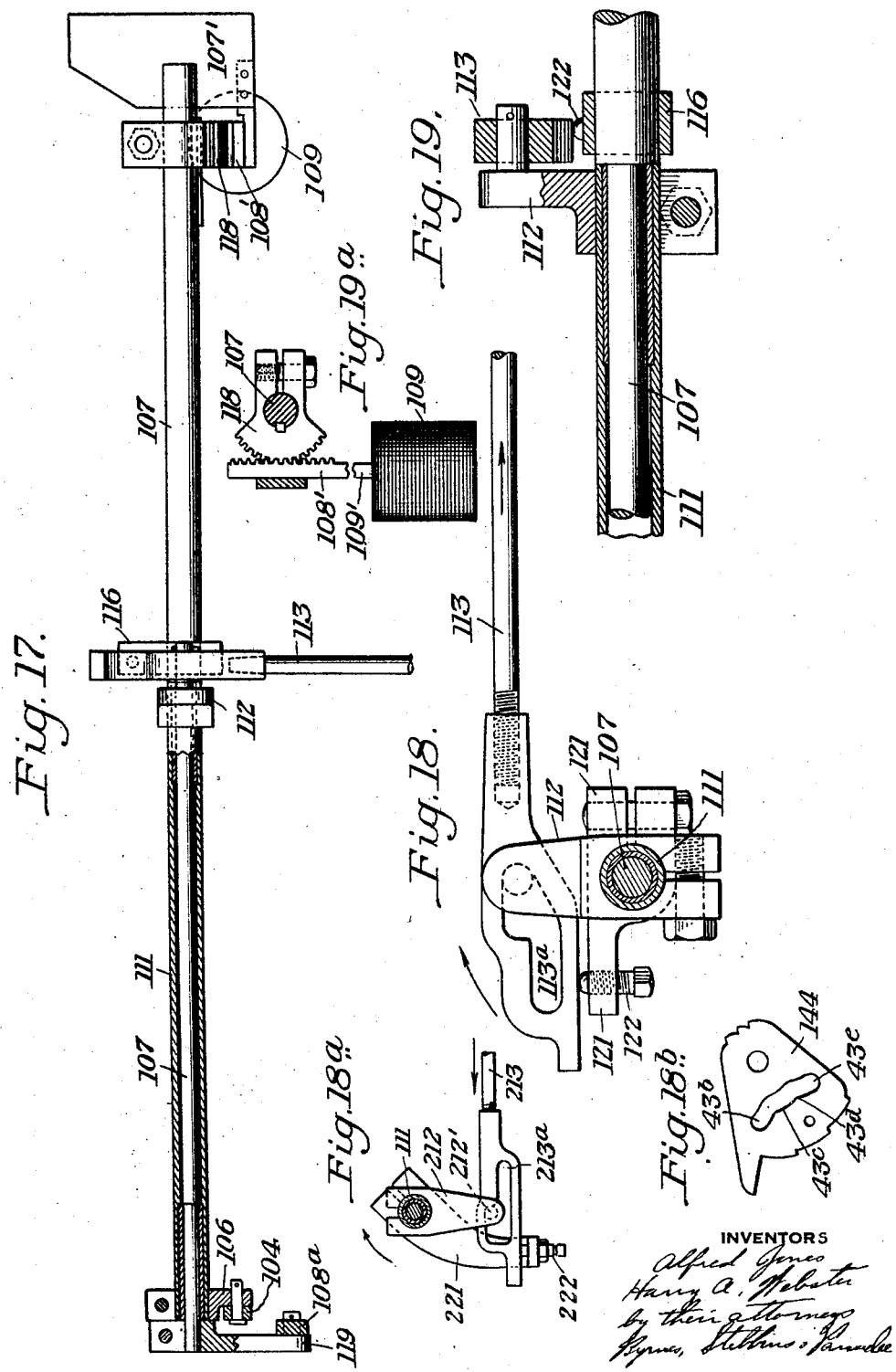

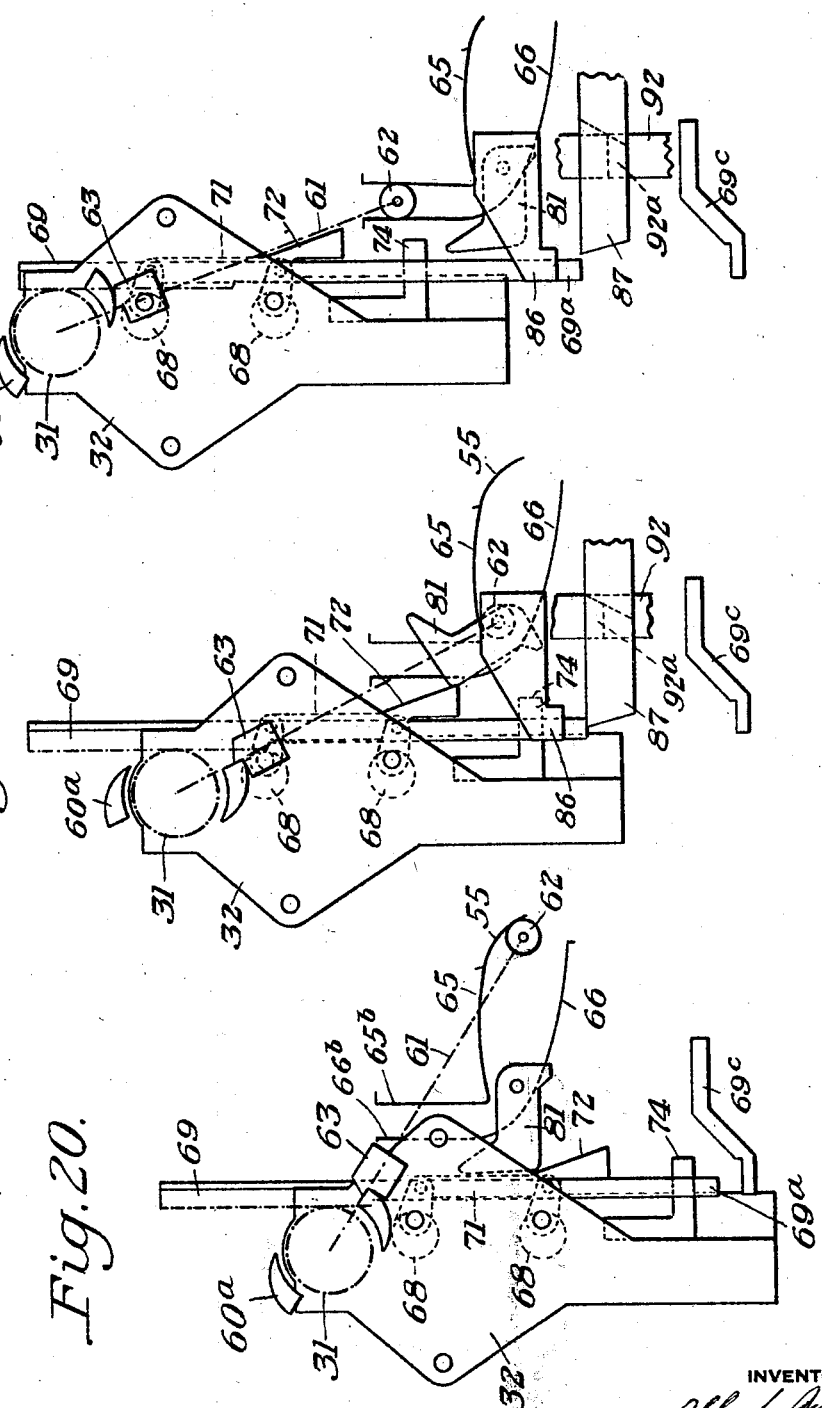

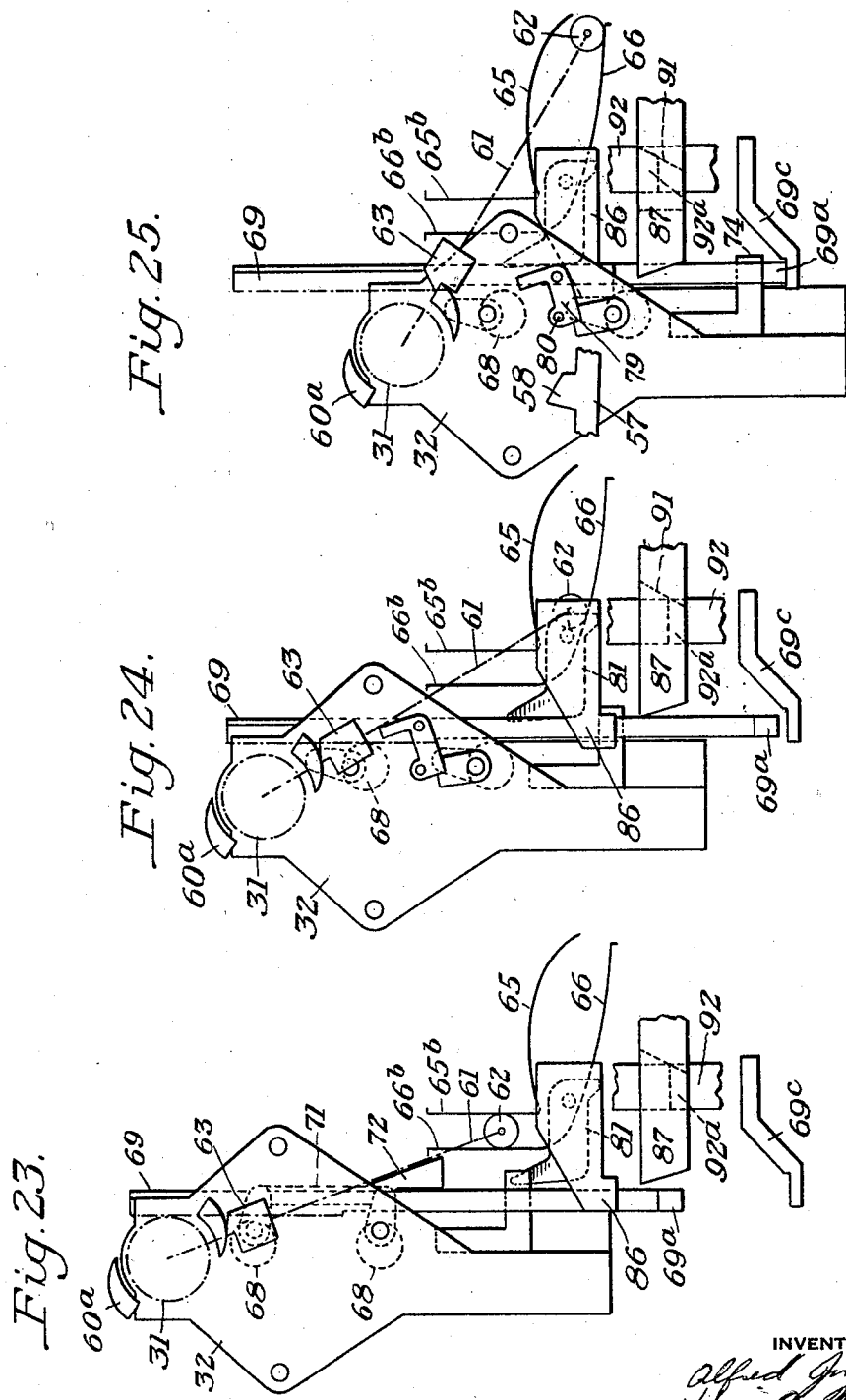

Patented Jan. 13, 1931

1,788,397

UNITED STATES PATENT OFFICE

ALFRED JONES AND HARRY A. WEBSTER, OF LANCASTER, PENNSYLVANIA, ASSIGNORS TO ARMSTRONG CORK COMPANY, OF PITTSBURGH, PENNSYLVANIA, A CORPORATION OF PENNSYLVANIA

MACHINE FOR PRINTING FLOOR COVERINGS

Application filed October 14, 1926. Serial No. 141,516.

This invention is for a machine for printing linoleum and other floor coverings and relates more particularly to an improvement in the printing head thereof and operating means therefor.

In the printing of linoleum rugs and other hard surface floor coverings, a continuous strip of material is fed intermittently under a series of vertically reciprocable printing heads. The printing machine has a separate head for each color appearing in the rug, and in order to print the transverse border of the rug, there must also be a separate head for each color in the border. Consequently, since the borders ordinarily contain all or most of the colors and tints found in the body of the rug, there can be used only half as many colors or tints in the rug as there are printing heads in the machine, or conversely, the number of printing heads must be greatly increased to secure a variety of colors, and such an increase in the number of heads, materially increases the length of the machine and the cost thereof.

In machines of this type, the printing heads are raised and lowered by simultaneously operated cams, and holding means are provided for automatically preventing any one of the heads from lowering into printing position at a predetermined time. This holding means which is provided for each individual head, is necessary to prevent the body blocks from lowering to printing position when that portion of the web of material is passing under the block on which a cross border is to be applied, and to prevent the cross border printing blocks from lowering into printing engagement with that portion of the rug which carries the body pattern. One system of obtaining such predetermined control of the lowering of the printing blocks is shown in our Patent 1,263,900 of April 23, 1918, for printing block control mechanism.

In machines of this type, there is provided a paint pot for each printing head. All of the paint pots are connected to reciprocate longitudinally of the machine in unison. The arrangement is such that the paint pots move under the printing heads in one direction when all of the printing heads are in their uppermost position. In passing under the printing heads they apply paint thereto. After the next printing operation, and when all of the blocks are again in their highest position, the paint pots move in the opposite direction. In reciprocating in this manner, the pots apply the separate colors to the several blocks in the proper manner. Inasmuch as each block prints only a portion of the pattern in the body or in the border of the rug, it is essential that the blocks be very accurately positioned with respect to one another in order that there is no overlapping of the areas which they print.

At the same time, the blocks must be spaced a sufficient distance apart to allow for the stationary position of the paint pots. The printing heads are usually spaced from each other in such a way that the center of one is removed from the center of the preceding an amount equal to twice the width of the printing blocks. This assures the proper registration of the respective patterns and allows ample room for the paint pots.

According to the present invention it is proposed to provide some of the printing heads with two blocks so arranged that either of them may be brought into printing position. One block will be a body block and the other will be a border block of the same color. It will thus be seen that if all of the printing heads are thus arranged, the number of colors or tints which may be used can be doubled, and if only a part of the heads are provided with two blocks, the number of colors can be increased according to the number of heads so constructed.

It is further proposed that the double block arrangement be such that it can be used on machines of the present type. This is most effectively done by having the printing heads provided with printing blocks on the opposite surfaces thereof and providing means for rotating the printing blocks through 180° when it is desired to change from one block to the other.

According to the preferred embodiment of the invention, the rotation of the heads through an arc of 180° is accomplished automatically. In the printing of rugs with a machine having reversible printing blocks of this type, it will be appreciated that the body block will make several impressions according to the length of the rug being printed, after which the block must reverse at the proper time, and on its next printing operation, the cross border must be printed, after which the block must again reverse in order that the body of the rug may again be printed. In other words, one side of the block will not be used as much as the other side of the block, and means must be provided for turning the block at the proper time and then immediately reversing it after it has made a single impression.

The printing heads with their attached blocks are several feet long and are quite heavy. It is therefore impractical to turn them from one position to the other too rapidly, and at the same time, they must be turned in such a way that they will not damage the material being printed nor interfere with the reciprocation of the paint pot. The machine must be capable of operating just as fast as single head printing machines.

According to the preferred embodiment of our invention, the arrangement is such that the printing block will lift a slight distance off the material being printed before it starts to rotate. Then as the printing head continues to move upwardly, the head will be revolved. By the time the head has reached its uppermost position, it will have been entirely reversed. The head will then be lowered a slight distance where it will remain stationary long enough for the paint pot to pass thereunder, after which it will move down into printing engagement with the goods. If it is necessary to reverse the block for the next printing step, this will be automatically taken care of, and if it is not necessary for the block to reverse, the block will continue to rise and lower without reversing until it again becomes necessary for it to reverse.

From the foregoing, it will be seen that our invention includes an arrangement whereby a reversible head is provided, that in order to save time in printing, the reversing movement occurs on the upward movement of the head, that this reversing movement does not begin until the printing block has been lifted vertically sufficiently to clear the goods being printed; that the reversing movement is selectively controllable and that the sequence of reversing is such that several impressions are made with one block of the head to a single impression made by the other block, and that notwithstanding the fact that the head is reversible, it is firmly locked against rotation except when reversing is to take place. The invention may be readily understood by reference to the accompanying drawings, which illustrate one embodiment of our invention.

A preferred embodiment of the invention is illustrated in the accompanying drawings in which Fig. 1 is a side elevation of a printing machine of the usual type having one head thereof of the usual non-reversing construction and having the next succeeding head of the reversing construction, part of the casing over the head rotating mechanism of the reversible block being broken away to disclose the operating mechanism.

Fig. 2 is a diagrammatic view illustrating a machine having a series of reversible printing blocks.

Fig. 3 represents a transverse section through the printing machine.

Fig. 4 is a detail section on a larger scale in the plane of line IV—IV of Fig. 3.

Fig. 5 is a top plan view of a portion of one of the printing blocks and the reversing mechanism therefor, the casing for the reversing mechanism being shown in section.

Fig. 6 is a detail perspective view of the toggle link forming a part of the control mechanism.

Fig. 7 is a detail view on a larger scale showing the block reversing control cam and the operating means associated therewith.

Fig. 8 is a plan view of a shaft and pinion functioning in the reversing of the printing head, and of the coupling between the shaft and head.

Fig. 9 is a side elevation showing a detached portion of the said rotating mechanism apart from the control therefor.

Fig. 9ª is a perspective view of a ratchet through which a partial rotation of the head is effected.

Fig. 10 is a detached detail view showing the rack and pinion mechanism through which rotation of the head is completed.

Fig. 11 is a horizontal section in the plane of line XI—XI of Fig. 10.

Fig. 12 is a front elevation of the rack shown in Fig. 10.

Fig. 13 is a perspective view showing a detail of a latch member for limiting endwise movement of the rack shown in Fig. 12.

Fig. 14 is a perspective view of a reciprocable post having a cam surface thereon for retracting the latch shown in Fig. 13.

Fig. 15 is a detail view of the eccentric operating mechanism by means of which the rack shown in Fig. 10 is brought into and out of mesh with the pinion on the head rotating shaft.

Fig. 16 is a perspective view of the single tooth ratchet forming a part of the eccentric control mechanism illustrated in Fig. 15.

Figs. 17, 18 and 19 are detailed views showing the control connections through which the reversing cam shown in Fig. 7 is set into operation.

Fig. 18ª is a modification showing a reverse arrangement for the part shown in Fig. 18.

Fig. 18<sup>b</sup> is a side elevation of a modified form of control cam for use with the control link arrangement of Fig. 18<sup>a</sup>.

Fig. 19<sup>a</sup> is a side elevation of the electromagnetically operated rack and segment gear which appears in plan in Fig. 17.

Figs. 20 and 25 inclusive are diagrammatic views illustrating different steps in the sequence of operation of the reversible printing head.

In the drawings, 5 designates the supporting frame of a standard printing machine, 6 are the platens which are fixed in the frame of the machine, 7 are the pads on top of the platens and the continuous web of material being printed is designated 8. Arranged over each platen is a printing head.

In Fig. 1, we have shown a standard printing head 10 of the type now commonly employed. Reversible printing heads are also shown, these being designated 11. All of the printing heads may be reversible, as shown in Fig. 2, or standard and reversible heads may be used together as indicated in Fig. 1.

The standard printing head 10 has a cross frame thereon comprised of I-beams 10<sup>a</sup> and these I-beams serve to support the removable printing block 10<sup>b</sup>. Each of the reversible printing heads has I-beams 11<sup>a</sup> similar to those provided in the standard printing head and on the top of the I-beams 11<sup>a</sup> is secured a printing block 12<sup>a</sup> and on the bottom of the I-beams is a second printing block 12<sup>b</sup>.

The reversible printing heads 11 are rotatably supported in bearings 13 at the top of vertically reciprocable posts 14 and 15 at opposite sides of the machine frame. The posts 14 and 15 are the same as those now provided for the usual single block printing heads as shown in Fig. 1. At the lower end of the post 14 is a roller 14<sup>a</sup> for engagement with a cam 16 and on the lower end of the post 15 is a similiar roller 15<sup>a</sup> for engagement with a similar cam 17. The cams 16 and 17 are secured to the opposite ends of a transverse shaft 18 supported in the frame of the machine. The shaft 18 is driven through a worm 19 from a longitudinally extending shaft 20. In actual practice, all of the shafts 18 are rotated in synchronism, and all of the cams 16 and 17 for the respective printing heads are correspondingly positioned.

The cams 16 and 17 are shaped to impart a vertically reciprocable movement to the printing heads upon rotation of the cams to effect a raising and lowering movement of the printing heads. This is true whether the printing heads are of the reversible type or are of the type 10 shown in Fig. 1, and so much of the mechanism as had been herein described is now commonly employed in machines of this character. Attached to each of the posts 15 is a counterweight 21, as best shown in Fig. 1. The purpose of the cams 16 and 17 is to raise the printing heads while they are free to drop by gravity into printing engagement with the web of material supported on the platens below the printing heads.

In order to hold any printing head against downward movement after it has been elevated, a latch 23 is provided for each head, this latch being adapted to cooperate with a lug 24 on the post 15. A similar latch is, as a matter of practice, also provided on the other side of the machine on post 14, but forming no part of the present invention, is not shown. This is clearly shown in Fig. 1 in connection with the single printing head and is also employed for the other printing heads, although for the purpose of better showing the other features of the machine, this part of the mechanism is not illustrated in connection with the reversible printing heads.

In Fig. 1 the latch 23 is shown out of latching position. The operation of this latch mechanism is clearly described in our Patent No. 1,263,900 and constitutes no part of the present invention.

Supported above the frame of the machine and reciprocable longitudinally thereof, are a plurality of paint pots 25. Each of these pots has a roller 26 adapted to spread paint over the surface of the printing blocks when the pots are reciprocated in the usual way under the printing blocks when the latter are raised and are in paint receiving position. The pots 25 are all connected to operate in synchronism in accordance with the present practice in machines of this type.

According to our invention, each of the cams 16 and 17 has a low point 17<sup>a</sup>, a high point 17<sup>b</sup>, a short drop 17<sup>c</sup>, a dwell 17<sup>d</sup> and a drop from the point of dwell to the low point 17<sup>e</sup>. The cams all revolve in the direction of the arrow in Fig. 1, that is, in a counter-clockwise direction as in this view. The shape of the cam is such that the printing block will be lifted rapidly upon rotation from the low point 17<sup>a</sup> on the cam, to the point 17<sup>b</sup> where the printing head will be in its highest position. By reason of the slight drop at 17<sup>c</sup>, the printing head will lower slightly, and will then remain stationary while the dwell portion 17<sup>d</sup> of the cam is engaging the rollers on the respective posts 14 and 15. During this period of dwell, the paint pots will pass under the printing heads, and when the drop 17<sup>e</sup> is engaged, the printing heads are permitted to fall into printing position. The shape of the cam employed for the present apparatus is not materially different from that employed at present, in that it provides for lifting the printing heads above the paint receiving position and then dropping them a short distance to the proper height to receive paint. The shape, furthermore, is such that the head rises with accelerating speed to a certain point, after which it begins to decelerate.

In order to reverse the printing block so that either of the printing surfaces 12$^a$ or 12$^b$ may be selectively moved into printing position, means is provided for effecting such rotation when desired. A trunnion 27 at one end of each of the printing heads 11 is extended through the bearing 13 at one side of the machine and terminates in a tongue 28 that cooperates with a socket 29 in the end of a rotatable shaft 30 having a pinion 31 thereon. The shaft 30 is rotatably supported in a frame 32 which is secured to the reciprocable post 15 so as to move up and down with the post. This frame 32 is contained within a stationary casing or housing 33 at the side of the machine. The shaft 30 is rotated in the manner hereinafter more fully described. In order to hold the printing head against rotation except when rotation thereof is desired, a locking disc 34 is secured to the trunnion 27, and a pair of locking levers 35 are provided in the frame 32 for cooperation therewith. The locking levers 35 are mounted on the ends of shafts 36 which extend transversely of the frame 32. Each of the levers 35 has a lug 35$^a$ thereon adapted to project into notches 34$^a$ in the periphery of the disc 34. The notches 34$^a$ are spaced 180° from each other, and they are preferably of inwardly decreasing width.

The lugs 35$^a$ are wedge shaped. As wear develops between the notches and the lugs, the tapered shape of the lugs will cooperate with the sides of the notches whereby looseness between the locking parts will be prevented. The locking levers 35 are normally maintained in such position that the lugs 35$^a$ thereof are projected into the notches 34$^a$. It will be seen, however, that if the levers 35 are spread apart, the lugs 35$^a$ will be disengaged from the respective notches and thereby permit the head to rotate. Such movement of the locking levers is effected by means of short levers 37 depending from the opposite ends of the shafts 36. Each of these levers 37 is provided with a cam or projecting lug 37$^a$. The location and arrangement of these levers 37 is best shown in Figs. 4 and 7. A spring 38 carried on the frame 32 has one end thereof arranged to bear against one of the levers 37, as clearly shown in Fig. 7, in such way that it tends to urge the shaft 36 to rotate in a direction to hold the locking lever 35 in locking position.

A second spring 39 is provided on the frame 32 which tends to urge the other locking lever 35 into locking position. It will be seen that if the levers 37 are moved in toward each other against the pressure of the springs 38 and 39 the shafts 36 will rotate in a direction to spread the levers 35 apart and release them from locking position. Such movement of the levers is automatically effected in the operation of our machine as will be hereinafter described.

Pivotally supported on a bracket 33$^a$ in the housing 33 is a link 40 having a cam surface or projection 40$^a$ thereon. The lowermost end of this link 40 carries a pin 41 on which is a roller 42. The roller 42 projects through a cam slot 43 in a segment-shaped cam plate 44, pivotally supported on a supporting pin or stud 45 in the stationary housing 33. The cam plate 44 has a series of steps or ratchet teeth 46 on its wider edge and a series of reversely arranged ratchet teeth 46$^a$ on its narrower edge. The slot 43 is not concentric with the stud 45, but is of irregular shape, having in all, five positions for the roller 42, these being designated 43$^a$, 43$^b$, 43$^c$, 43$^d$ and 43$^e$. Positions 43$^a$, 43$^b$, and 43$^e$ are further from the center than 43$^c$ and 43$^d$. In Fig. 7 the roller 42 is shown in the second station 43$^b$ of the cam slot 43.

Pivotally supported in the housing 33 opposite the link 40 is a link 47 generally similar to the link 40 and having a lug 47$^a$ thereon corresponding to the lug 40$^a$ of the link 40. The lower end of the link 47 is pivotally connected at 48 with a toggle link 49 which connects to the upper end of a lever 50 pivotally supported in the frame 33 on the pin 51. The lowermost end of the lever 50 is pivotally connected at 52 with a link 53 whose other end pivotally connects at 54 with one end of a cam guide 55 pivotally supported between its ends on the stationary pin 56 in the frame 33.

Connected to the lever 50 between its point of support 51 and its lower end 52, is a main cross link 57 whose other end pivotally connects with the pin 41 on the link 40. The link 57 is shown in detail in Fig. 6 and, as there shown, is provided with an upwardly projecting lug 58 between its ends.

Looking at Figs. 4 and 7 particularly, it will be remembered that the frame 32 reciprocates with the post 15 while the housing 33, with the parts supported therein remains stationary. It will be seen that when the parts are in the position shown, the frame 32 can move up and down, and the locking levers will remain in locking position. Should the levers 40 and 47 be swung in toward each other, it will be seen that the respective lugs 40$^a$ and 47$^a$ thereon will project into the path of travel of the lugs 37$^a$ on the levers 37 when the levers are carried upwardly relatively to the links 40 and 47 by the upward movement of the frame 32. This will have the effect of swinging the levers 37 in toward each other, which, in turn will swing the locking levers 35 away from each other and release the head so that it may rotate. Movement of the links 40 and 47 into latch releasing position, as just described, is effected by means of the cam 44. When the cam 44 is rotated, as will be hereinafter explained, the roller 42 will travel from the high point at 43ᵇ to the low point 43ᶜ, thus swinging the lever 40 in toward the vertically movable frame 32. At the same time, the link 57 will be shoved to the right, as viewed in Fig. 7, rocking the lever 50, which will cause the lever 47 to be swung inwardly toward the lever 40. It is by this mechanism that the head is released to rotate when the same is necessary.

It has been hereinbefore suggested that the head will not rotate upon each reciprocation thereof, but that it will be rotated only at predetermined times. The mechanism for effecting rotation of the head, will now be described.

If the head would start to rotate just as soon as the printing head starts to lift, the head could be rotated through a simple rack and pinion mechanism. It will be obvious, however, that should the head start to rotate when it is in its lowermost position and is pressing against the goods being printed, then one edge of the printing block would dig into the material and the other edge of the block would swing into contact with the paint carriage. It accordingly becomes necessary to lift the head a slight distance before rotative movement is imparted thereto. It also is obvious that, on account of the enormous weight of the head, it can not be rotated too rapidly, and it therefore becomes desirable to rotate the head at first gradually and then at an accelerated speed, and then at a decelerated speed so as to reduce the force of the head at the completion of its turning movement. Furthermore, the distance through which the head is rotated must not be more than 180°, as it must be assured that the printing block will always be in a proper position to print after it has been turned. It accordingly is not desirable to use a simple rack and pinion mechanism for effecting the rotation of the head, but a rack and pinion is resorted to in effecting the final movement of the head, while a ratchet is used for rotating the head in the first instance. It is necessary, furthermore, that the ratchet and the rack and pinion mechanisms, be so arranged that the rack and pinion will start to function just as the ratchet mechanism has reached the limit of its movement, and it is necessary that these two mechanisms be co-related with a control, so that the head will only be rotated at predetermined times and not with every reciprocation of the head.

Carried on the outer end of the shaft 30, is a ratchet wheel 60 whose construction is best shown in Fig. 9ᵃ. This ratchet wheel has but two ratchet teeth or surfaces, designated 60ᵃ, these teeth being spaced 180° apart. Loosely carried on the end of the shaft 30 is a lever 61 having a roller 62 on its outer end. Carried on the lever 61, intermediate its ends, is a slidable pawl 63 having a tooth 63ᵃ thereon for cooperation with a tooth 60ᵃ of the ratchet disc 60. The pawl is urged into engagement with the ratchet tooth by means of a compression spring 64 supported on the lever 61. This lever and ratchet constitutes the means for rotating the head through the first part of its movement.

The cam roller 62 at the end of the lever 61 is located adjacent the gate or movable cam 55. This is best shown in Figs. 4, 5, and 7. When the cam 55 is in the position shown in Fig. 7, the frame 32 can raise and lower, and the gate 55 will offer no obstruction to the cam roller 62. The cam roller 62 may thus move up and down vertically with the printing movement of the head, and the lever 61 will not be operated. When however, the lever 57 is operated through the cam 44, to swing the links 40 and 47 in towards each other and release the latching levers 35, the gate 55 is simultaneously rocked through the link connection 53 to the dotted line position shown in Fig. 7. When the gate 55 moves over to this position, it extends across the path of normal vertical movement of the roller 62, and forms a continuation of a fixed cam surface 65 in the housing 33. The cam 65 has a horizontally extending surface 65ᵃ and a vertical surface 65ᵇ. The cam member 65 is spaced away from a second cam member 66 having a vertical surface 66ᵇ and a horizontally extending surface 66ᵃ that is spaced below the horizontally extending surface 65ᵃ of the cam 65.

When the gate 55 is swung inwardly to the dotted line position shown in Fig. 7 and the movable frame 32 starts to rise, the roller 62 will first start to lift vertically, but when it has moved vertically a slight distance, it will be obstructed by the gate 55. When this occurs the printing head will be far enough above the material so that it can start to rotate. The roller 62, being obstructed from vertical movement, will then swing the lever 61 as the frame 32 continues to rise, thereby rotating the ratchet disc 60 to revolve the printing head. By the time the printing head has been rotated a predetermined distance, the roller 62 will be between the two vertical guiding surfaces 65ᵇ and 66ᵇ and further rotation of the lever 61 will be prevented. It is at this point that the rack and pinion mechanism for completing the rotative movement of the head is brought into operation. The rack and pinion mechanism will now be described.

Carried in the vertically reciprocable frame 32 is a channel shape guide 67 supported in the frame 32 on a pair of eccentrics 68 which are horizontally pivoted in the frame 32. This construction is best shown in Figs. 10 and 11. Slidable in the guide 67 is a rack 69 whose lower end projects below the bottom of the supporting guide 67, and which has lugs 69ᵃ and 69ᵇ at its lowermost end. Secured to the pins 68ᵃ which support the two eccentrics 68 are cranks 70. These cranks are connected by a vertical link 71 having a wedge shaped terminal portion 72 below the lowermost eccentric. The link 71 is urged downwardly by means of a tension spring 73 secured to the link 71 and to a bracket 74 on the frame 31. This arrangement is best shown in Fig. 9. It will be seen that by reciprocating the link 71 vertically, the eccentrics 68 are simultaneously rotated. Such rotation of the eccentrics 68 moves the guide member 67 toward and away from the shaft 30 with its pinion 31. Inasmuch as the rack 69 is carried in this movable guide 67, such movement of the guide serves to bring the teeth of the rack into or out of mesh with the pinion 31.

The function of the spring 73 is to urge the link 71 downwardly to move the rack into engagement with the pinion. Inasmuch as reversal of the head does not occur with each vertical movement of the head and of the frame 32, means must be provided for normally holding the rack out of engagement with the pinion and for preventing the spring 73 from fuctioning. For this purpose, there is provided a dog or one-toothed ratchet arm 77 on the pin extension 68b of the lower eccentric 68. This dog or one-toothed ratchet 77 is shown in detail in Fig. 16. In Fig. 9 it is shown in its released position while in Fig. 1 it is shown in its set position. Pivotally mounted on the outside of the frame 32 at 78 is a bell crank shaped holding member or pawl 79 for cooperation with the holding dog 77. The lowermost corner 79a of the pawl 79 is adapted to engage the tooth 77a of the dog 77, as most clearly shown in Fig. 1. The tendency of the spring 73 is to rotate the eccentrics 68 together with holding dog 77 in a clock-wise direction, and it will be seen by an inspection of Fig. 1, how the element 79, cooperating with the teeth 77a normally prevents such rotation of the eccentrics.

Projecting laterally from the face of the member 79 is a pin 80. When the bar 57 that operates the two latch controlling links 40 and 47 moves to the right, as viewed from Fig. 7, the projection or lug 58 thereof is moved into line with the pin 80, which moves up and down with the frame 32. The operation of the bar 57 is such that it will move to the right when the frame 32, with its printing head, is in an elevated position. This operation will be hereinafter more fully described. When the frame 32 lowers, the pin 80 will contact with the lug 58 on the bar 57, and as the frame 32 continues to move down the corner 79a of the element 79 will be lifted out of contact with the tooth 77a of the dog 77, whereupon the spring 73 can function to rotate the eccentric system 90° to bring the rack into engagement with the pinion.

For withdrawing the rack from engagement with the pinion and resetting the eccentric system against the action of the spring 73, there is provided in the fixed frame 33 a pivoted arm 81, whose pivotal support is at 82. This arm has a vertical lug 83 thereon at one end thereof and has a downwardly projecting lug 84 on the opposite end thereof. The function of the lug 84 is to contact with a stationary part of the frame to prevent the arm 81 from turning in an anticlockwise direction from the position shown in Fig. 9, while permitting the arm to be rotated in a clockwise position a slight distance.

When the extension 72 on the link 71 rides up, with the frame 32, it will lift the lever 81 and ride past the lug 83 thereof. The lever 81 will then fall back to the position shown in Fig. 9 and when the frame 32 begins to lower, the square end of the extension 72 will hit the top of the lug 83, thereby forcing the link 71 upwardly, rotating the eccentrics 68 in a direction to withdraw the rack from engagement with the pinion. By reason of the fact that the link 71 is carried at the outer ends of the levers 70, the member 72 will eventually move into a position where it can ride past the lug 83 with the continued downward movement of the frame 32. When the link 71 is lifted in the manner indicated, the eccentrics are rotated in a counter-clockwise direction, and the dog 77 is correspondingly moved. The tooth 77a thereon rides under the corner of the member 79a and the eccentric system is held against rotation until the member 79 is released, as hereinbefore explained.

It is, of course, obvious that in order for the rack 69 to be effective in rotating the pinion 31, the rack 69 shall be stationary during a portion of the upward travel of the pinion with the head 32. At the same time, if the first part of the rotative movement of the shaft 30 is to be effected by the lever 61, and not by the rack and pinion mechanism, it will also be seen that during a portion of the reciprocating movement of the head 32, the rack 69 must be free to rise with the head. This is true because the rack is forced into engagement with the pinion just at the end of the downward movement of the head, as has been heretofore explained in connection with the operation of the holding pawl 79.

In order to provide for the upward movement of the rack 69 with the frame 32, the eccentric operated carrier 67 is provided, and to provide for the necessary relative movement between the pinion and the rack, the rack 69 is slidably mounted in the carrier 67. If the head 32 starts to move upwardly with the rack in engagement with the pinion, and the lever 61 functions to rotate the pinion, through the cooperation of the roller 62 with the cam elements 55 and 65 as hereinbefore explained, the rotation being in a clock-wise direction, the pinion 31 will tend to roll on the rack 69, but the rack 69, being carried in the member 67 mounted in the frame 32 will also rise, but there will be a differential movement, the rack 69 moving up with less speed than the frame 32. When the rack has been carried up a predetermined distance in this way, the lug 69ª at the bottom of the rack will come into contact with stationary lugs 86 in the stationary frame 93, carried inside the housing 33. At this time, the roller 62 on the end of the lever 61 will be in line with the vertical cam or guiding surfaces 65ᵇ and 66ᵇ, so that the cam 65 will have no further tendency to rotate the lever 61. At this point, the continued upward movement of the frame 32 will tend to roll the pinion 31 on the now stationary rack 69 to complete the rotative movement of the head through its arc of 180°. When the rack 69 has been carried to its highest position, and further upward movement has been limited by contact with lugs 86, the horizontally movable latch bar 87 shown in Fig. 4 will be projected, by reason of the compression spring 88, beneath the lug 69ª on the end of the rack, and thereby hold it in this elevated position. The latch 87 is slidably guided in a stationary part 93 of the fixed frame 33. The latch bar, which is shown in detail in Fig. 13, has a vertically disposed slot or groove 90 therein, and one edge of this groove, 91, is inclined to provide a cam engaging surface. Mounted in a stationary part of the frame 33 on the support 93, is a vertically reciprocable post 92, the support 93 for this post having keepers 94 thereon in which the post 92 is frictionally held against a free-sliding movement. The post 92 has a projecting lug 92ª on one face thereof, and this lug has an inclined face 92ᵇ for co-engagement with the inclined surface 91 in the slot 90 of the latch bar 87. The arrangement is such that the lug 92ª provides a cam for retracting the latch bar 87 against the compression of the spring 88 when the bar 92 is forced downwardly. It will be noted that the end of the latch is inclined so that the lug 69ᵇ on the rack will cam the latch back on the upward movement of the rack. When it projects under lug 69ᵇ, the latch prevents the rack from moving down until released.

The purpose of the latch bar 87 is to prevent the rack 69 from moving down until such operation of the rack is desired. When the head is rotating, it acquires considerable momentum, and the tendency of the head would be to rotate past the hundred and eighty degree limit through which it should rotate. By projecting the latch bar 87 under the rack, the head can not rotate after the frame 32 has reached its uppermost position. This is due to the fact that the rack 69, in mesh with the pinion, will not be free to move downwardly. It can thus be assured that the locking lugs 35ª on the locking levers 35 will enter the recess 34ª in the disc 34 at the end of the 180° rotation of said disc. The latch has another important function. It has just been pointed out that the rotating head acquires considerable momentum, and that, up to a certain point it is lifting and rotating with accelerating speed. Now, in the upper part of the movement, when it is desired to decelerate the head, its momentum will tend to carry it around faster than desired. Since, however, downward movement of rack 69 is limited by the latch, the rack provides a positive check, assuring deceleration of the rising head, which can rotate no faster than the driving pinion 31 rolls on the rack.

Supported on the top of the frame member or support 93, as best shown in Fig. 1, is a horizontally pivoted lever 95. One end of this lever bears against the end of the slidable bar 92, while the other end of the lever is in the path of travel of the pinion shaft bearing 32ª (Fig. 5). As the frame 32 reaches its highest limit of movement, it will rock the lever 95 upwardly, depressing the bar 92. When the part 32 has reached its uppermost position, the bar 92 will have been forced down to the lower limit of its movement, and in moving down, the cam 92ª will cooperate with the inclined surface 91 to retract the latch. The cam will continue to hold the latch retracted (by reason of the functional engagement of the keepers 94 with the bar 92) until the movable frame 32 has reached the lower limit of its movement, at which time the movable frame 32 will rock a lever 97, similar to the lever 95, downwardly. One end of the lever 97 bears against the lower end of the bar 92, as shown in Fig. 1, so that the downward movement of the frame 32 will force the bar 92 upwardly, removing the cam lug 92ª from its engagement with the slot 90 of the latch bar 87. The latch bar at this time will be yieldably projected into the path of travel of the lug 69ᵇ, and will be forced back when the lug 69ᵇ rides upwardly against it, as heretofore pointed out. Positive restoration of the rack to normal position on the downward movement of the head is assured by reason of the fact that the end of the rack will come against a fixed bracket 69ᶜ when the head is in its lowermost position. Lug 74 engaging lug 69ᵇ insures of the rack 69 coming down when the carrier 32 comes down.

The mechanism through which the reversing movement of the head is controlled, may now be described. It has been previously pointed out that the release of the locking levers 35, the swinging of the control cam or gate 55, and the release of the one-toothed ratchet 77 in the eccentric system is all effected by the movement of the bar 57 to the right as viewed in Fig. 7. Any suitable means could be employed for shifting the bar 57 back and forth at the proper time and in the proper sequence. We have shown the segment shaped cam plate 44 with its staggered slot 43 as one method of obtaining proper movement of the bar 57.

It has been hereinbefore mentioned that one of the printing blocks on the reversible head will carry a body pattern and one of the blocks will carry a transverse border pattern. There will be several successive impressions made by the body block, then a single impression by the border block, and then succeeding impressions by the body block. This is the sequence ordinarily employed although it will be obvious that the invention is not necessarily limited to such particular sequence of operation.

The cam slot 43 in the cam plate 44 has five different positions, as heretofore pointed out, these being an upper position at $43^a$ and a lower position at $43^e$, and intermediate positions $43^b$, $43^c$, and $43^d$. The ratchet teeth 46 on the wider end of the plate 44 are turned downwardly and the number of teeth corresponds to the number of positions in the cam slot 43. The teeth $46^a$ on the other end of the plate 44 are reversely arranged and there are but four of these teeth.

Arranged for cooperation with the teeth 46, is a pawl 100 pivotally supported on a fixed bracket 101 on the stationary frame 33 at 102. The pawl 100 is in the shape of a bell crank and pivotally connected to the horizontal arm thereof at 103 is the end of a vertically movable rod 104 which is normally urged upward by a compression spring 105 that serves to hold the pawl 100 in engagement with the ratchet teeth 46. The rod 104 may be pulled down to disengage the pawl from engagement with the teeth. Any preferred means for effecting such movement may be employed, but we prefer to use the motion of the latch 23 of the printing head adjacent to the head under consideration and toward the end of the machine at which the printing starts. The opening or closing of this latch occurs at the moment when the printing heads are in their uppermost position. Either the opening or closing movement of the latch may be utilized. The arrangement shown in Figures 17, 18, and 19 and $19^a$ is employed where the opening movement of the latch is utilized. In order to secure proper operation, the first head at the starting end of the machine is preferably single, and non-reversible, as shown in Fig. 1. Referring to Fig. 1 in connection with Figs. 17, 18, 19 and $19^a$, the shaft carrying the head latch 23 has a crank 115 connected thereto, and connected to the free end of this crank at 114 is a link 113. The opposite end of the link 113 is in the form of a stepped loop $113^a$ and engages a wrist pin $112'$ on the crank 112. The crank 112 is secured to one end of the sleeve or quill shaft 111, and this shaft has a crank 106 secured thereto at its outer end. The outer end of the crank 106 is pivotally connected to the vertically movable rod 104.

When the latch 23 opens, the lever 113 rocks the quill shaft 111, pulling down on the rod 104 to thereby disengage pawl 100 from the teeth of the segmental cam plate 44. The cam plate is then free to drop, but gravity is not sufficient to effect a downward movement of the cam plate. Positive operating means therefore is provided. In Fig. 1 we have shown a simple arrangement employing a solenoid 109 having its armature directly connected through links 108 and $108^a$ with the segmental cam plate 44. However, Fig. 1 does not show the parts in their best position, inasmuch as it is desirable to have the solenoid located in the frame of the machine and not at the side of the machine where it would be in the way of the operator. The correct relation of the parts is shown in Figs. 17, 18, 19 and $19^a$. The solenoid has its armature $109'$ provided with a rack $108'$. This rack engages teeth on a segment 118 secured to the shaft 107. The shaft 107 is supported in the frame of the machine in a bearing at $107'$ and has a reduced extension passing through the quill shaft 111. The outer end of this extension is provided with a crank 119. The end of the crank 119 is connected through link $108^a$ with the cam plate 44.

Obviously, the solenoid 109 is energized only at predetermined times, and its operation is intermittent. The solenoid is controlled through a switch 110 of any suitable standard type, diagrammatically illustrated in Fig. 1. The parts are so set that the closing of the switch occurs a moment after the rod 104 has pulled the pawl 100 out of engagement with the teeth on the cam plate 44, there being sufficient extra travel allowed for this purpose. The solenoid, upon being energized, will reciprocate the rack $108'$ to rotate the shaft 107 through the gear segment 118. As the shaft 107 rotates the rod $108^a$ will be pulled down, pulling the cam plate to its lowest position. As the end of the action of the solenoid is reached, a lever 121 adjustably secured to the shaft 107, and having an adjustable striking point 122, will engage the loop $113^a$ on the end of the lever 113, which will kick the stepped loop out of engagement with the wrist pin $112'$ on the crank 112. When the armature of the solenoid is fully home and the cam plate 44 in its lowermost position, the kick out of the stepped loop $113^a$ is complete. On the downward movement of the rod 104 the spring 105 is compressed. When the stepped loop $113^a$ releases crank 112, this spring reacts to force the rod 104 upward, allowing pawl 100 to drop into engagement with the teeth of the segmental cam plate 44 and at the same time open the switch 110 to de-energize the solenoid. The parts are then reset for the next operation. The operation of releasing and pulling down the cam plate 44 is accomplished very rapidly so that the consequent movement of the various parts controlled by the shifting of the cam from one position to another does not interfere with the operation of the machine during this resetting portion of the operation.

If the closing movement of the latch 23 is utilized the reverse arrangement shown in Fig. 18ª is employed and a slight modification of the cam plate 44 is necessary. The modified form of cam plate is shown in Fig. 18ᵇ where the cam plate is designated 144. Because of the fact that the closing movement succeeds the opening movement, it is necessary that the reversing of the head be accomplished sooner than where the control is effected before the opening movement of the latch. Therefore, the cam 144 is provided with only four stations in its cam slot, instead of five. This requires also that the number of teeth on its periphery be one less.

The arrangement of the stepped loop on the operating connection between the latch and the quill shaft 111 must be reversed when the closing movement of the latch is utilized. This reversed arrangement is shown in Fig. 18ª where 213 designates the operating rod through which motion is transmitted from the latch. This rod is connected with the latch mechanism in the same way that the rod 113 is connected, and is provided with a stepped loop 213ª which engages wrist pin 212′ on the crank 212 carried on the quill shaft 111. The quill shaft and the parts associated therewith are not different from the construction shown in Figs. 17 and 18 and, therefore, the same reference numerals have been used to designate the corresponding parts. Secured to the shaft 107 is a lever 221 corresponding in function to the lever 121 shown in Fig. 18 and having an adjustable striking terminal 222. The purpose of the lever 221 with its striking pin 222 is to effect the kick out of the stepped loop arrangement at the desired time.

It may be pointed out in connection with the arrangement shown in Figs. 18ª and 18ᵇ that in machines as they are now built, the releasing of the latch 23 is accomplished by gravity while the setting of the latch is accomplished by power. It is for this reason that it becomes desirable to operate the control mechanism for the rod 104 on the closing of the latch, which is a power operation, rather than on the opening of the latch, which is a gravity operation.

Pivotally supported on the movable carrier 32 at 116 is a pawl 117 whose free end is adapted to cooperate with the ratchet teeth 46ª on the segmental plate 44. This pawl is urged into engagement with the teeth 46ª by means of the spring 38 which also operates one of the levers 37.

The operation of a single reversible printing head may now be traced. When the locking lever 23 of the preceding head moves to releasing position, it does so when all of the printing heads are elevated. When it moves to releasing position, it pulls the rod 113 to the right as viewed in Fig. 1, and closes the contacts to the solenoid 109. At this time, the pawl 100 is engaged in the lowest tooth 46 of the series, and the cam roller 42 is in the last position of the cam slot 43, that is, position 43ᵉ. As soon as the solenoid 109 is energized, the pawl 100 is drawn out of engagement with the lowest tooth 46 of the series, and the cam plate 44 drops, so that the roller 41 is in the first position 43ª of the cam slot 43. The printing head which is being controlled, will at this time be lowering, and when the printing head has lowered sufficiently, the pawl 117 on the vertically reciprocable frame 32 will engage the first, or lowest tooth 46ª on the segment plate 44. As the pawl 117 moves down in engagement with this tooth, it will rotate the plate 44 on its pivot 45 in a clockwise direction, as viewed in Fig. 7, one full tooth.

This will move the cam roller 41 to the second position of the cam, and the parts, when the carrier 32 is in its lowest position, will be in the position shown in Fig. 7. The switch 110 is so operated that the solenoid 109 is only momentarily energized, and by the time the parts have assumed the position shown in Fig. 7, the solenoid 109 will have been de-energized and the pawl 100 will function to prevent the cam 44 from dropping back the one step that it has been advanced by the pawl 117. The printing head will then begin to rise, and the carrier 32 will also rise with it. On the upward movement of the frame 32 the pawl 117 will ride over the teeth 46ª of the plate 44. It will be noted that in advancing from position 43ª to 43ᵇ the roller 42 will not have been moved laterally so that there will be no lateral movement of the rod 57. On the next downward movement of the head and the carrier 32, the pawl 117 will advance the plate 44 to its third position.

When the roller 42 moves from position 43ᵇ to the third position 43ᶜ, the rod 57 is shifted laterally and the lug 58 is moved into the path of the downcoming pin 80 on the holding element 79. As the part 32 continues to move down, the pin 80 on the holding element contacts with the lug 58 and releases the one toothed ratchet 77, as hereinbefore explained, whereupon the tension spring 73 rotates the eccentric-system, including the eccentrics 68, to shift the rack guide 67 to the left as viewed in Figs. 9, 10 and 11, bringing the rack 69 into engagement with the pinion 31. This movement of the rod 57 to the right, as viewed in Fig. 7, will also function to swing the levers 40 and 47 in toward each other, but this will not occur until after the levers 37 with their projections 37ᵃ have passed below the projections 40ᵃ and 47ᵃ of the levers 40 and 47 respectively. The locking levers 35 will therefore not be released, and the reversible printing head will be firmly held against rotation. At the same time that the levers 40 and 47 are swung in toward each other, the gate or movable cam 55 is rocked in to the dotted line position shown in Fig. 7.

After the printing head has made its impression, it will start to rise. It will rise a short distance until the printing surface of the head is well above the linoleum or other floor covering which has been printed. When it is at a sufficient elevation, the lugs 37ᵃ on the levers 37, which are moving upwardly with their carrier 32, will engage the lugs 40ᵃ and 47ᵃ respectively of the levers 40 and 47. This will swing the levers 37 in toward each other, spreading the locking levers 35 and leaving the reversible head free to rotate. At the same time, the roller 62 on the lever on 61 will engage the under surface of the cam gate 55. The parts will then be in the position shown in the diagram in Fig. 20. As the part 32 continues to rise, the lever 61 is rocked through a considerable arc by means of the roller 62 co-engaging with the cam surfaces, and the disc 60 will be rotated by means of the ratchet 63 on the lever 61 through an arc, to partially rotate the printing head. It will be seen that the rotative movement does not begin until the printing surface has been lifted clear of the linoleum, and that this rotative movement occurs while the head is continuing to rise. The arrangement is such that the swinging of the head will not bring the head into contact with any of the paint carriages.

During the time that the printing head is being rotated by the lever 61, the pinion 31 will be rotating, tending to push the rack 69 down, but the rack 69, being mounted in the reciprocable carrier 67, will move up. There will, however, be a differential, the rack moving upward less rapidly than the pinion. Fig. 21 shows the position of the parts at the time the lever 61 has swung through substantially its maximum arc of movement. At the time the parts reach the position shown in Fig. 21, the toes or lugs 69ᵃ at the lower end of the rod 69, will encounter the stationary abutments 74 that will prevent further upward movement of the rack bar. From this time on, the carrier 32 will move upwardly while the rack bar remains stationary, so that the pinion 31 will roll on the rack and rotate the printing head. Just as soon as the lowermost end of the rack 69 has been lifted to a position where the toes 69ᵃ will encounter the abutments 86 the reciprocable latch bar 87 best shown in Fig. 4 will be projected by the spring 88 to the right so that its end will extend under the rack bar 69 and prevent the rack bar from moving down. During the time that the head is being rotated the rack bar 69 is so held against downward movement.

While the head is being rotated, the lugs 35ᵃ on the locking levers 35 are riding on the periphery of the locking disc 34. When the operating cam 17 has reached its highest position 17ᵇ, the part 32 and the printing head will have reached their highest point of travel and the printing head will have been rotated through an arc of 180°. The locking levers 35 will immediately function to hold the head against rotation after it has been turned, and by reason of the fact that the rack bar 69 is held against downward movement, it is assured that the printing head will not rotate more than 180°.

When the part 32 has reached its extreme limit of upward movement, the rod 95 has pushed the vertically reciprocable rod 92 down, and the cam 92ᵃ thereon, cooperating with the inclined surface 91, on the latch 87, has forced the latch to the left as viewed in Fig. 4 so that the rack is no longer held against downward movement. In Fig. 22 the position of the parts is shown when the head is in its highest position.

By reason of the contour of the cam 17 the head will drop a short distance from its highest point and will then dwell at an intermediate position, just a short distance below its highest position for a considerable time while the paint carriage passes under the printing surface. The parts are then in the position shown in Fig. 23.

The head again starts to lower from the paint receiving position. In lowering the wedge-shaped extension 72 of the eccentric operating link 71 will engage the nose 83 of the dog 81, and rotate the eccentric system to withdraw the rack 69 from engagement with the pinion 31. However, since there has been no lateral movement of the bar 57, the lug 58 will still be in the path of the descending pin 80 on the holding dog 79, and the eccentric system will be released to again move the rack into engagement with the pinion. By reason of the ratchet teeth 60ᵃ and the ratchet 63, the lever 61 will have no tendency to rotate the printing head on the downward movement of the reversing mechanism. With the downward movement of the head on this stroke, the pawl 117 will engage the third tooth in the series 46ᵃ, and move the segment plate one more step bringing the roller 41 into the fourth position.

In moving from the third to the fourth position, the roller 42 does not transmit any lateral movement to the bar 57.

When the printing head has moved down to its printing position, which is its lowest position, the lever 97 is rocked by engagement of bracket 74 therewith, to lift the post 92 so that the latch 87 will be free to function with the next upward movement of the rack. The printing head again starts to move up and as it moves up the turning operation is again effected. This provides for the printing head making only a single impression with one side thereof while a series of impressions are made with the other printing block thereof. As the head again reaches its uppermost position, the parts are again in the position shown in Fig. 22. The head then lowers to the paint receiving position shown in Fig. 23. After a dwell in this position, the head starts to lower and as it does so, the pawl 117 advances the segment plate 44 to the last stop, and in moving from the fourth to the fifth and last position, the roller 42 moves the rod 57 to the left as viewed in Fig. 7, withdrawing the lug 58 from the path of downward travel of the pin 80 on the holding dog 79. The dog 81, functioning in conjunction with the extension 72 on the eccentric operating link 71 will cause the rack to be withdrawn from the pinion 31, and since the lug 58 on the bar 57 has been moved out of the path of travel of the pin 80, the rack will remain out of engagement with the pinion on the downward movement of the head. At the same time that the bar 57 is moved to the left, as viewed in Fig. 7 the levers 40 and 47 are spread apart so as to be out of the path of travel of the projections 37ª on the levers 37, and the gate 55 is swung to the vertical position shown in Fig. 7. The pawl 100 will at this time be again engaging the last tooth 46 on the wider end of the plate 44. As long as the parts stay in this position, there will be no further reversing movement of the head, as the roller 62 on the lever 61 can move up and down vertically without coming into contact with the cam gate 55, and the rack will remain out of engagement with the pinion. When the roller 42 is in the last position of the cam slot 43, there are no further teeth for the pawl 117 to engage, and the pawl 117 will reciprocate up and down along the edge of the plate 44, without engagement with teeth 46ª.

No further reversing operation will take place until the latch of the preceding head operates to reset the parts for the reversing cycle. It will thus be seen that any number of impressions can be made from one side of the block after which a single impression can be made from the other side of the block, and the block again reversed and a series of impressions made from the first side of the block.

The advantages of the invention will be readily appreciated. By having a plurality of printing blocks which are selectively operable over a given position, the number of colors which may be used in a printing machine having a restricted number of printing heads can be greatly increased. By means of the particular construction and arrangement shown, the reversible printing block is made applicable to machines of the present type without changing the construction thereof in any material detail and without interfering with the movement of the paint pots or carriages. With the particular arrangement shown, the head is lifted so that it is entirely clear of the linoleum or other floor covering being printed, and then it turns while it is rising so that by the time it reaches its uppermost limit of movement, it has been completely reversed. This effects a saving of time in that no extra time is required for reversing the head, and the production of the machine is not reduced. The head is rotated at first gradually, then at an accelerated speed, and then with a decelerated motion so as to minimize to the greatest possible extent, the effect of the momentum of the heavy head structure. The head rotates in one direction only, and is arranged so that there is no looseness in the head, the head being firmly locked at the time it is receiving paint and when it is in printing position.

The particular cam mechanism, including the segmental cam 44 is so arranged that the reversing operation can take place at a certain time with respect to the travel of the linoleum through the machine. This arrangement makes it particularly adaptable to machines of the present type. It is also a construction which readily permits of the control of the reversing movement of one head from the printing movement of a preceding head. The entire machine is positive in its operation, and the parts are very simple in construction. While the movement of the parts in sequence is intricate, the parts themselves are very simply constructed and relatively few in number.

We have illustrated and described in detail one embodiment of our invention but it will be understood that this is merely illustrative of our invention and that the invention may be otherwise embodied within the spirit of our invention and under the scope of the following claims, that various mechanisms may be used to effect the movement of the printing head from a position where one printing block is used to a position where another printing block is used.

We claim:

1. A machine for printing floor coverings having a plurality of printing stations, and a plurality of printing blocks in some stations selectively movable in a variable sequence into operable position.

2. A machine for printing floor coverings having a plurality of printing stations, a reciprocable printing head at each station, some of the heads having a plurality of printing blocks thereon selectively movable in variable sequence into printing position.

3. A machine for printing floor coverings having a plurality of printing stations, a reciprocable printing head at each printing station, some of said heads being rotatable and having a plurality of printing blocks thereon, means for selectively rotating the rotatable heads in variable order, and means for normally holding the rotatable heads against rotation.

4. In a machine for printing floor coverings, a vertically reciprocable printing head, and a plurality of printing blocks associated with the head and selectively movable in variable sequence into operative position thereon.

5. In a machine for printing floor coverings, a vertically reciprocable printing head, a plurality of printing blocks associated with the head, and means operable upon reciprocation of the head for selectively moving any block in variable sequence into printing position.

6. In a machine for printing floor coverings, a frame adapted for the longitudinal movement of material therethrough, a vertically reciprocable printing head, a plurality of printing blocks associated with the head adapted to print in the same zone longitudinally of the machine, means for selectively bringing any printing block into printing position, and a control mechanism for selectively governing the movement of the blocks into position to print on said zone.

7. In a machine for printing floor coverings, a pivotally supported printing head, means for reciprocating the printing head, a plurality of printing blocks on the pivotally supported head, and means operable in variable sequence for rotating the head to selectively present any one of the printing blocks in printing position.

8. In a machine for printing floor coverings, a pivotally supported printing head, means for reciprocating the printing head, a plurality of printing blocks on the pivotally supported head, and means operable in variable sequence for rotating the head to selectively present any one of the printing blocks in printing position, said means being operable upon reciprocation of the head.

9. In a machine for printing floor coverings, a pivotally supported printing head, means for reciprocating the printing head, a pair of printing blocks carried by the head, means operable upon reciprocation of the head for swinging the head through a limited arc for selectively moving either printing block into printing position, and a control mechanism for said means.

10. In a machine for printing floor coverings, a vertically reciprocable printing head having a pair of printing blocks thereon, and means for moving the head up and down, and a means for moving either block into printing position in variable sequence.

11. In a machine for printing floor coverings, a vertically reciprocable printing head, a pair of printing blocks associated with the head, and selectively operable means operable upon the upward movement of the head for selectively bringing either of the printing blocks into printing position.

12. A machine for printing floor coverings having a plurality of reversible printing heads, and means for independently controlling in variable sequence the reversing movement of each head.

13. A machine for printing floor coverings having a plurality of vertically reciprocable reversible printing heads, means associated with each head for effecting the reversing movement thereof, and means for each head for selectively controlling the reversing movement thereof 14. A machine for printing floor coverings having a plurality of vertically reciprocable reversible printing heads, means associated with each head for effecting the reversing movement thereof, and separate means for each head for selectively controlling the reversing movement thereof.

15. A machine for printing floor coverings having a plurality of vertically reciprocable reversible printing heads, means associated with each head for effecting the reversing movement thereof, and separate means for each head for selectively controlling the reversing movement thereof, said last named means being operatively controlled by a preceding head.

16. In a machine for printing floor coverings, a reversible printing head having printing blocks on the opposite faces thereof, means for reciprocating the printing head, means for rotating the printing head for selectively bringing either block into printing position and in variable sequence, and locking means for holding the head against rotation.

17. In a machine for printing floor coverings, a reversible printing head having printing blocks on the opposite faces thereof, means for reciprocating the head vertically, locking means for normally holding the head against rotation, means for rotating the head for selectively bringing either block into printing position, and a control mechanism for governing the operation of the head rotating means.

18. In a machine for printing floor coverings, a reversible printing head having printing blocks on the opposite faces thereof, means for reciprocating the head, means for rotating the head, means for normally locking the head against rotation, and a control mechanism for releasing the locking means and causing the head rotating means to operate when it is desired to reverse the printing head.

19. In a machine for printing floor coverings, a reversible printing head having printing blocks on the opposite faces thereof, means for reciprocating the printing head, and means operable upon the reciprocation of the head for effecting the reversing movement thereof, and a control mechanism for said last named means whereby the rotation of the head may be selectively governed.

20. In a machine for printing floor coverings, a reversible printing head having printing surfaces on the opposite faces thereof, means for reciprocating the head, means for rotating the head whereby either of the printing surfaces may be brought into operative position, and means for selectively controlling the operation of said head rotating means.

21. In a machine for printing floor coverings, a reversible printing head having printing surfaces on the opposite faces thereof, means for rotating the printing head to bring either printing surface into operative position, means for reciprocating the head, and means including a cam for selectively controlling the operation of the head rotating means.

22. In a machine for printing floor coverings, a reversible printing head, having printing blocks on the opposite faces thereof, means for reciprocating the head, means including a rack and pinion for imparting a rotative movement to the head, and control means for rendering the rack and pinion operative to rotate the head.

23. In a machine for printing floor coverings, a reversible printing head having printing blocks on the opposite faces thereof, a ratchet mechanism through which the head is partially rotated, a rack and pinion mechanism through which the head is partially rotated and a common means for rendering both of said rotating means operative.

24. In a machine for printing floor coverings, a reversible printing head having printing blocks on the opposite faces thereof, means for reciprocating the printing head, and means effective for rotating the head upon the upward movement thereof, and means for selectively rendering the head rotating means operable.

25. In a machine for printing floor coverings, a reversible printing head having printing blocks on the opposite faces thereof, means for reciprocating the printing head, and means effective for rotating the head upon the upward movement thereof, and means for selectively rendering the head rotating means operable, and locking means for normally holding the head against rotation, said locking means also being controlled by said last mentioned means.

26. In a machine for printing floor coverings, a reversible printing head having printing blocks on the opposite faces thereof, means for reciprocating the head, means for rotating the head upon the upward movement only thereof, said means being effective only after the head has been raised a predetermined distance above the material being printed.

27. In a machine for printing floor coverings, a reversible printing head having printing blocks on the opposite faces thereof and means for reciprocating the printing head vertically, means for rotating the head upon the upward movement only thereof, said means including a rack and pinion, and a control mechanism for selectively rendering the rack and pinion operative.

28. In a machine for printing floor coverings, a reversible printing head having printing blocks on the opposite faces thereof, means for reciprocating the printing head vertically, means for rotating the printing head, said means including a cam operated lever for effecting a partial rotation of the head, and a rack and pinion for completing the rotative movement of the head, and a common control mechanism for rendering the cam operated lever mechanism and the rack and pinion mechanism operable.

29. In a machine for printing floor coverings, a reversible printing head having printing blocks on the opposite faces thereof, means for reciprocating the printing head vertically, means for rotating the printing head, said means including a cam operated lever for effecting a partial rotation of the head, and a rack and pinion for completing the rotative movement of the head, and a common control mechanism for rendering the cam operated lever mechanism and the rack and pinion mechanism operable, the said lever mechanism and rack and pinion mechanism being effective upon the upward movement of the head, the said mechanisms being so arranged that the rotative movement of the head begins after the head has been lifted clear of the surface being printed.

30. In a machine for printing floor coverings, a reversible printing head, means for reciprocating the printing head vertically, means for rotating the head on the upward movement thereof, locking means for normally holding the head against rotation and means for selectively effecting the operation of said head rotating means and simultaneously releasing the locking means.

31. In a machine for printing floor coverings, a reversible printing head having trunnions at each end thereof and having printing blocks on its opposed faces, vertically reciprocable posts in which the trunnions are mounted, a carrier secured to one of the posts, a stationary framework in which the carrier is housed, and cooperating means on the carrier and stationary framework for effecting rotative movement of the head.

32. In a machine for printing floor coverings, a reversible printing head having printing blocks on the opposed surfaces thereof, and having trunnions at its opposite ends, posts in which the trunnions are mounted, means for reciprocating the posts vertically, a carrier secured to one of the posts, a rack guide mounted in the carrier, a rack slidable in the guide, the pinion on one of the trunnions being in juxtaposition to the rack, eccentric means for moving the guide toward and away from the pinion to bring the rack into or out of engagement with the pinion, means operable upon the downward movement of the head for moving the eccentrics in one direction, a spring for moving the eccentrics in the opposite direction, a trip mechanism for normally holding the spring means from functioning, and a selectively operable member for releasing the trip.

33. In a machine for printing floor coverings, a reversible printing head having printing blocks on the opposed faces thereof, trunnions at the opposite ends of the head, a locking disc on one of the trunnions, a pinion on one of the trunnions, and a ratchet disc on one of the trunnions, vertically reciprocable posts in which the trunnions are mounted, a carrier secured to one of the posts for reciprocation therewith, a lever associated with the carrier having a pawl thereon for cooperation with the ratchet disc, a rack in the carrier movable into and out of engagement with the pinion, means on the carrier for operating the rack into and out of mesh with the pinion, means for limiting the vertical movement of the rack with respect to the carrier whereby the rack will function to rotate the pinion during a portion of the upward travel of the carrier, and a stationary frame around the carrier having means thereon for controlling the operation of the rack and for controlling the operation of the said lever, and a control mechanism in the stationary frame including a cam element having ratchet teeth thereon and a pawl on the carrier for engagement with the ratchet teeth on the control member.

34. In a machine for printing floor coverings, a reversible printing head having printing blocks on the opposed faces thereof, and having trunnions at its opposite ends, one of the trunnions having a pinion thereon and having a ratchet disc thereon, vertically reciprocable posts in which the trunnions are mounted, means for reciprocating the posts vertically, a carrier secured to one of the posts, means on the carrier for rotating the reversible head, said means including a rack for engagement with the pinion on said trunnion and including a lever for engagement with the ratchet on said trunnion and a stationary frame structure enclosing the carrier having means thereon for controlling the operation of said rack and lever.

35. In a machine for printing floor coverings, a reversible printing head having printing blocks on the opposed faces thereof, trunnions at the opposite ends of the head, a locking disc on one of the trunnions, a pinion on one of the trunnions, and a ratchet disc on one of the trunnions, vertically reciprocable posts in which the trunnions are mounted, a carrier secured to one of the posts for reciprocation therewith, a lever associated with the carrier having a pawl thereon for cooperation with the ratchet disc, a rack in the carrier movable into and out of engagement with the pinion, means on the carrier for operating the rack into and out of mesh with the pinion, means for limiting the vertical movement of the rack with respect to the carrier whereby the rack will function to rotate the pinion during a portion of the upward travel of the carrier, and a stationary frame around the carrier having means thereon for controlling the operating of the rack and for controlling the operation of the said lever, and a control mechanism in the stationary frame including a cam element having ratchet teeth thereon, and a pawl on the carrier for engagement with the ratchet teeth on the control member, and a releasable locking means on the carrier for cooperation with said locking disc.

36. The combination with a reversible printing head having opposed printing surfaces and having trunnions at the end thereof, one of which is provided with a pinion, of means for imparting a vertically reciprocable movement to the head and for rotating the head including a vertically reciprocable carrier in which that trunnion having a pinion thereon is mounted, a rack guide in the carrier reciprocable toward and away from the pinion, a rack slidable in the guide, an eccentric for moving the guide toward and away from the pinion to engage and disengage the rack and the pinion, a spring for rotating the eccentric in one direction, a trip mechanism for normally holding the spring against operation, a stationary frame about the carrier, a control element for the trip in the stationary frame, means for limiting the upward movement of the rack with the carrier, a latch mechanism for holding the rack against downward movement during a portion of the upward travel of the carrier, and means controlled by the up and down movement of the carrier for operating the latch.

37. The combination with a reversible printing head having locking means and having rotating means, which rotating means includes a rack and pinion mechanism and a ratchet lever mechanism, both of which mechanisms are controllable through a single control system, of control means for such system including a selectively operable cam member having a plurality of different positions, in which at least two successive positions cause a reversing movement of the cam, and means operable upon the reciprocation of the printing head for effecting a step by step movement of said cam whereby the printing head will be reversed at two succeeding movements.

38. The combination with a printing machine for floor coverings having a reversible printing head and means for reversing the head, of a control means for controlling the operation of said reversing means, said control means being normally inoperative to effect a reversing movement of the head, a release mechanism for setting the control means into operation, means operable upon the successive reciprocation of the head for further operating the control means, said control means being operable to effect reversal of the head on two succeeding reciprocations of the head.

39. The combination with a printing machine for floor coverings having a reversible printing head and means for reversing the head, of a control means for controlling the operation of said reversing means, said control means being normally inoperative to effect a reversing movement of the head, a release mechanism for setting the control means into operation, means operable upon the successive reciprocations of the head for further operating the control means, said control means being operable to effect reversal of the head on two succeeding reciprocations of the head and to thereafter remain inoperative until said release means is again actuated.

40. In a machine for printing floor coverings, a reversible printing head having printing blocks on the opposed faces thereof, means operable for rotating the head upon the upward movement thereof, a control means for selectively controlling the reversing movement of the head, and locking means for holding the head against reversal, and means associated with the control means for releasing the locking means when the head is to be reversed.

41. In a machine for printing floor coverings, a reversible printing head having printing blocks on the opposed faces thereof, means for reciprocating the head, means for reversing the head, locking means for the head, including a pair of locking levers movable toward each other to locking position and having lugs thereon, and having operating extensions therefor and a disc associated with the head having notches therein for co-engagement with the lugs of said levers, said levers being mounted to reciprocate with the head, and means for releasing the locking means including cam members movable into and out of the path of travel of the operating extensions of said locking levers.

42. In a machine for printing floor coverings, a reversible printing head having printing blocks on the opposed faces thereof, means for reciprocating the head, means for reversing the head, locking means for the head, including a pair of locking levers movable toward each other to locking position and having lugs thereon, operating extensions for the levers, and a disc associated with the head having notches therein for co-engagement with the lugs of said levers, said levers being mounted to reciprocate with the head, and means for releasing the locking means including cam members movable into and out of the path of travel of the operating extensions on said locking levers, means for rotating the head upon the upward movement thereof, and means operatively connected with said cam members for controlling the operation of said head rotating means whereby the head will be caused to rotate when the locking levers are released.

43. In a machine for printing floor coverings, a reversible printing head having printing blocks on the opposed faces thereof, means for reciprocating the head including a cam having a lifting surface for raising the head a short drop for partially lowering the head, having a dwell surface for holding the head in a partially elevated position, and having a drop surface for lowering the head into printing position, means selectively operable for rotating the head on the upward movement thereof, said means being arranged to cause rotation of the head only after it has lifted a predetermined distance above the goods being printed, said means being also arranged to rotate the head first with an accelerating motion and then with a decelerating motion, and means for controlling the operation of said head rotating means, said head rotating means being effective for rotating the head only through an arc of 180° with each reciprocation of the head.

44. In a machine for printing floor coverings, a reciprocable frame, a rotatable head thereon carrying a plurality of printing blocks, and a plurality of means for effecting rotation of the head.

45. In a machine for printing floor coverings, a reciprocable frame, a plurality of printing blocks thereon and selectively movable into operative position, and a plurality of means for effecting movement of the blocks.

46. In a machine for printing floor coverings, a reciprocable frame, a plurality of printing blocks thereon and selectively movable into operative position, and a plurality of successively operable means for effecting rotation thereof.

47. In a machine for printing floor coverings, a vertically reciprocable printing head, a plurality of printing blocks associated with the head, and cam controlled means operable upon reciprocation of the head for selectively moving any block into printing position.

48. In a machine for printing floor coverings, a vertically reciprocable printing head, a plurality of printing blocks associated with the head, and control means whereby one block prints a plurality of times, the control means being effective for thereafter moving another block into printing position.

49. In a machine for printing floor coverings, a vertically reciprocable printing head, a plurality of printing blocks thereon, and means for moving the blocks into printing position whereby they are operated in a cycle wherein different printing blocks print a different number of times.

50. In a machine for printing floor coverings, a printing head, a second printing head having a plurality of movable blocks thereon, means for moving the blocks, and a control for said moving means actuated by the mechanism of the first-mentioned head.

51. In a machine for printing floor coverings, a printing head, a second printing head having a plurality of movable printing blocks, means for moving the blocks, a latch for the first-mentioned head, and a control for said moving means actuated by movement of the latch.

In testimony whereof we have hereunto set our hands.

ALFRED JONES.
HARRY A. WEBSTER.